(12) United States Patent
Jiang et al.

(10) Patent No.: US 9,646,184 B2
(45) Date of Patent: May 9, 2017

(54) INFORMATION READING SYSTEM, READING CONTROL DEVICE, READING CONTROL METHOD, AND RECORDING MEDIUM

(71) Applicant: FUJITSU LIMITED, Kawasaki-shi, Kanagawa (JP)

(72) Inventors: Shan Jiang, Zama (JP); Yuichi Murase, Yokohama (JP); Keiju Okabayashi, Sagamihara (JP); Katsushi Sakai, Zama (JP); Hiroshi Hidaka, Kawasaki (JP); Junya Fujimoto, Atsugi (JP); Moyuru Yamada, Machida (JP); Riichiro Take, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/607,546

(22) Filed: Jan. 28, 2015

(65) Prior Publication Data

US 2015/0220762 A1  Aug. 6, 2015

(30) Foreign Application Priority Data

Feb. 4, 2014  (JP) .................................. 2014-019659

(51) Int. Cl.
  *G06F 17/00* (2006.01)
  *G06K 7/10* (2006.01)
(52) U.S. Cl.
  CPC ..... *G06K 7/10128* (2013.01); *G06K 7/10396* (2013.01); *G06K 7/10356* (2013.01)

(58) Field of Classification Search
  CPC ........... G06K 7/10128; G06K 7/10396; G06K 7/10356; G02B 27/0172; G02B 2027/0138; G02B 2027/0178
  USPC ......................................... 235/492; 340/10.1
  See application file for complete search history.

(56) References Cited

U.S. PATENT DOCUMENTS

| 9,104,271 B1* | 8/2015 | Adams | G06F 3/0426 |
| 2004/0182925 A1* | 9/2004 | Anderson | B07C 7/005 235/385 |
| 2006/0067357 A1* | 3/2006 | Rader | H04L 12/12 370/463 |
| 2007/0008152 A1* | 1/2007 | Parias | F17C 13/003 340/573.1 |
| 2007/0017983 A1* | 1/2007 | Frank | G06Q 10/087 235/385 |
| 2007/0288104 A1* | 12/2007 | Yamauchi | G06F 3/014 700/52 |

(Continued)

FOREIGN PATENT DOCUMENTS

CN  203299840 U  * 11/2013
JP  2012-165379     8/2012

(Continued)

*Primary Examiner* — Laura Gudorf
(74) *Attorney, Agent, or Firm* — Staas & Halsey LLP

(57) ABSTRACT

An information reading system includes a passive-type IC tag that identifies a device installed on side of an environment, a tag reader that reads identification information of the passive-type IC tag, a sensor unit that detects a touch operation performed with respect to the passive-type IC tag, and a reading control unit that, when the sensor unit detects a touch operation, activates the tag reader and controls timing of reading the passive-type IC tag.

13 Claims, 26 Drawing Sheets

(56) References Cited

U.S. PATENT DOCUMENTS

2010/0097195 A1* 4/2010 Majoros ............... G06K 7/0008
340/10.6
2012/0202423 A1 8/2012 Tiedemann et al.

FOREIGN PATENT DOCUMENTS

| JP | 2013-182544 | 9/2013 |
| JP | 2013-222355 | 10/2013 |

* cited by examiner

INFORMATION READING SYSTEM, READING CONTROL DEVICE, READING CONTROL METHOD, AND RECORDING MEDIUM

CROSS-REFERENCE TO RELATED APPLICATION

This application is based upon and claims the benefit of priority of the prior Japanese Patent Application No. 2014-019659, filed on Feb. 4, 2014, the entire contents of which are incorporated herein by reference.

FIELD

The embodiments discussed herein are directed to an information reading system, a reading control device, a reading control method, and a recording medium.

BACKGROUND

A technology called near field communication (NFC) is known as one of the technologies in which radio frequency identification (RFID) is used. The NFC technology is applied in providing a variety of task support for maintenance and management of facilities; a variety of task support in distribution; and a variety of task support in medical care.

Patent Document 1: Japanese Laid-open Patent Publication No. 2012-165379

Patent Document 2: Japanese Laid-open Patent Publication No. 2013-182544

However, in the NFC technology mentioned above, it is difficult to read information of tags at low power as explained below.

That is, in the NFC technology mentioned above, a reader or a writer performs polling at regular intervals. At that time, if there is no tag present in the communication range of the reader or the writer; then, regardless of the fact that no data is communicated with any tag, the reader or the writer happens to perform polling in a repeated manner. As a result, unnecessary electrical power is consumed while reading the tags.

SUMMARY

According to an aspect of an embodiment, an information reading system includes a passive-type IC tag that identifies a device installed on side of an environment, a tag reader that reads identification information of the passive-type IC tag, a sensor unit that detects a touch operation performed with respect to the passive-type IC tag, and a reading control unit that, when the sensor unit detects a touch operation, activates the tag reader and controls timing of reading the passive-type IC tag.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. However, the present invention is not limited to the embodiments described herein. Moreover, the embodiments can be appropriately combined without causing contradiction in the processing details.

[a] First Embodiment

System Configuration

Figure 1:
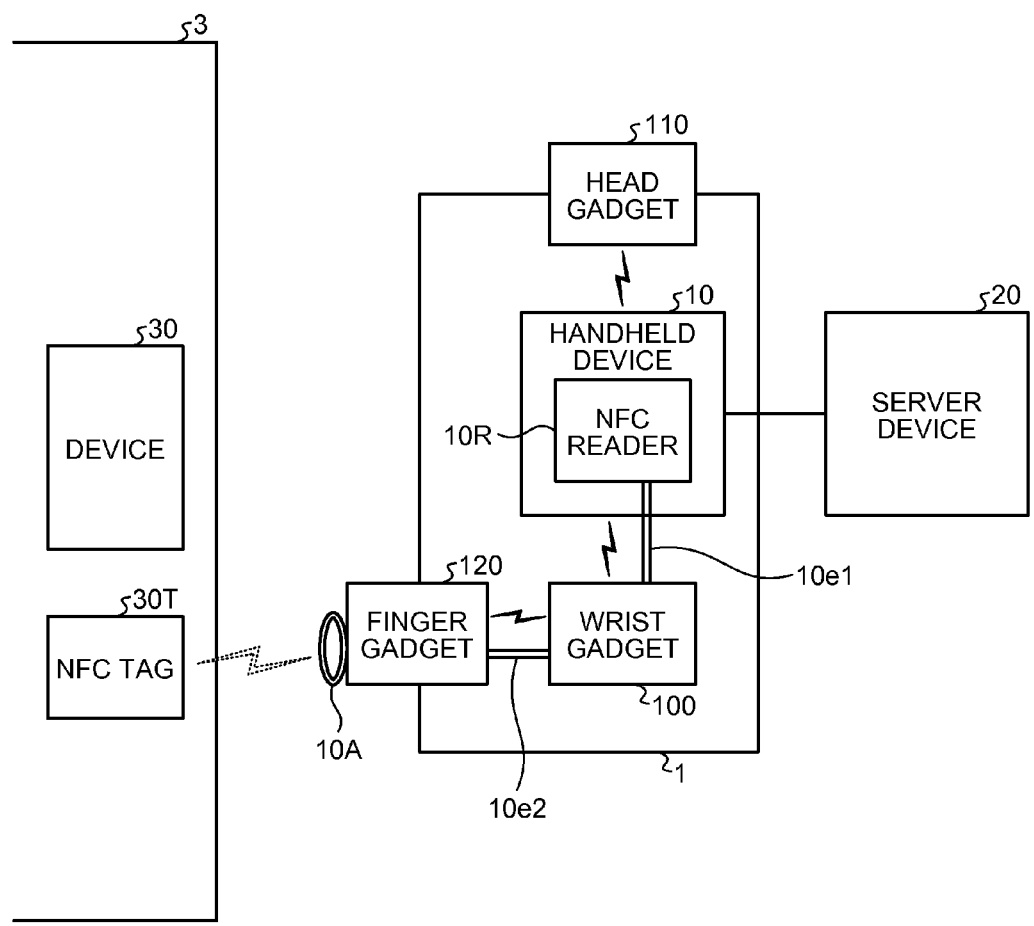
FIG. 1 is a diagram illustrating a system configuration of an information reading system according to a first embodiment.

FIG. 1 is a diagram illustrating a system configuration of an information reading system according to a first embodiment. In the information reading system illustrated in FIG. 1, information of an NFC tag 30T, which is disposed on the side of an environment 3, is read using an NFC reader 10R.

As an aspect of the information reading system, information read from the NFC tag 30T, which is associated to one or more devices 30 installed on the side of the environment 3, is used to provide a task support system for supporting a worker 1 to perform the task of inspecting the devices 30. Herein, as an example, it is assumed that the NFC tag 30T and the device 30 are associated on a one-to-one basis, and that the seal-shaped NFC tag 30T is attached in the vicinity of the corresponding device 30. Herein, with reference to FIG. 1, the explanation is given for an example of supporting the task of device inspection. However, alternatively, the information reading system can also be implemented in cargo booking or delivery in the field of distribution or in managing medicinal supplies or medical equipment in the medical field.

As illustrated in FIG. 1, the information reading system houses a handheld device 10, a server device 20, the NFC tag 30T, a wrist gadget 100, a finger gadget 120, and a head gadget 110. Meanwhile, in FIG. 1, only a functional configuration of the information reading system is illustrated. Thus, the scale, the dimensions, and the positioning of the devices are not limited to FIG. 1.

The handheld device 10 and the server device 20 are connected in a mutually communicable manner via a predetermined network. The network can be any arbitrary communication network, whether of the wired type or of the wireless type. Examples of the communication network include the Internet, a local area network (LAN), or a virtual private network (VPN). Moreover, the wrist gadget 100, the head gadget 110, and the handheld device 10 are communicably connected using a near field communication technology such as Bluetooth (registered trademark) low energy (BLE). Furthermore, the wrist gadget 100 and the finger gadget 120 are also communicably connected using a near field communication technology. Meanwhile, with reference to FIG. 1, the explanation is given for an example in which connection is established using wireless communication. However, it is also possible to use a wired network for establishing a communicable connection.

The NFC tag 30T is a tag in which an integrated circuit (IC) chip having identification information recorded therein is embedded. The NFC tag 30T is also called an "RFID tag". As an example of the NFC tag 30T, it is possible to use passive-type RFID tag that does not have a built-in power source and that functions by conversion of signals sent by the NFC reader 10R into electrical power. More particularly, when weak radio waves are sent by the NFC reader 10R, an induced current is generated in an antenna coil embedded in the IC chip of the NFC tag 30T. With the induced current serving as the driving force, the NFC tag 30T activates the IC chip embedded therein and becomes able to communicate with the NFC reader 10R. Meanwhile, in the following explanation, the identification information recorded in the NFC tag 30T is sometimes written as "tag ID (IDentifier)".

The handheld device 10 represents a terminal device that is carried by the worker 1. Examples of the handheld device 10 include a mobile communications terminal such as a smartphone, a cellular phone, or a personal handyphone system (PHS); and a slate terminal such as a personal digital assistant (PDA).

As an example, as the handheld device 10, a device equipped with the NFC reader 10R is used. As a result of using the NFC reader 10R, the reading of tag IDs can be performed by moving the handheld device 10 close to the NFC tags 30T. However, in this case, every time a tag ID is to be read, the worker 1 needs to retrieve the handheld device 10 from a predetermined position and to place the handheld device 10 at a predetermined position.

In that regard, in the first embodiment, as illustrated by double lines in FIG. 1, an antenna 10A is extended from the NFC reader 10R in such a way that the extension cable of the antenna 10A extends till the finger gadget 120 via the wrist gadget 100. As a result, instead of having to move the NFC reader 10R close to the NFC tag 30T, the worker 1 can move the finger gadget 120 close to the NFC tag 30T with the aim of reading the tag ID. Thus, the tag ID can be read using the handheld device 10 in a hands-free manner. Meanwhile, as an example, the following explanation is given under the assumption that a worker carries out inspection while keeping the handheld device 10 in a pocket of the clothing.

The wrist gadget 100, the head gadget 110, and the finger gadget 120 represent gadgets to be worn by the worker 1 on the body. For example, the worker 1 wears the wrist gadget 100 on a wrist. Moreover, the worker 1 wars the head gadget in the head region. Furthermore, the worker 1 wears the finger gadget 120 on a finger. Herein, as an example, it is assumed the finger gadget 120 is worn on an index finger. However, it is possible to wear the finger gadget 120 on any finger.

Moreover, the finger gadget 120 assumes the role of being the installation position of the antenna 10A as well as collects a variety of sensor data. The sensor data is used in a detection operation performed using the wrist gadget 100.

The wrist gadget 100 assumes the role of being a relay position between the an antenna extension cable 10e1 and an antenna extension cable 10e2, as well as performs a detection operation using the sensor data collected by the finger gadget 120. For example, the wrist gadget 100 can make use of the detection result in controlling the timing of reading the tag ID of the NFC tag 30T.

The head gadget 110 includes an information providing unit that provides information to the worker 1. Herein, the head gadget 110 can be configured as a headset, or as a head-mounted display (HMD), or as a gadget having the functions of a headset as well as an HMD.

The server device 20 is a computer that provides a task support service. The server device 20 can be configured by installing, in a desired computer, a task support program that implements the task support service in the form of packaged software or online software. For example, the server device 20 can be implemented as a Web server that provides the task support service, or can be implemented as a cloud that provides the task support service in the form of outsourcing.

For example, the server device 20 downloads, in the handheld device 10, an application program for enabling the handheld device 10 to implement the task support service. Once the application program is installed, the handheld device 10 can provide a variety of information.

As a specific example, to the head gadget 110, the handheld device 10 can provide map information of the environment 3, in which the worker 1 performs inspection, and the current position on the map. Moreover, the handheld device 10 can also display inspection information related to the device 30 registered as the target for inspection. For example, the device name, the inspection items, and the position on the map can be displayed. Furthermore, when the tag ID is read from the NFC tag 30T, the handheld device 10 can perform gesture recognition using the finger gadget 120 and receive the input of the inspection result of the device 30 corresponding to that tag ID. For example, if the target device for inspection is a light emitting diode (LED) used in indicating malfunctioning of the device, then the handheld device 10 receives input of "OK" when the LED turns "green" but receives input of "no good" when the LED turns "red". Thus, it becomes possible to receive input of the inspection result related to the malfunctioning of the device. Alternatively, if the target device for inspection is a meter, then the worker 1 inputs the numerical value indicated by the meter. With that, it becomes possible to receive input of the inspection result related to the meter.

Configuration of Finger Gadget 120

Figure 2:
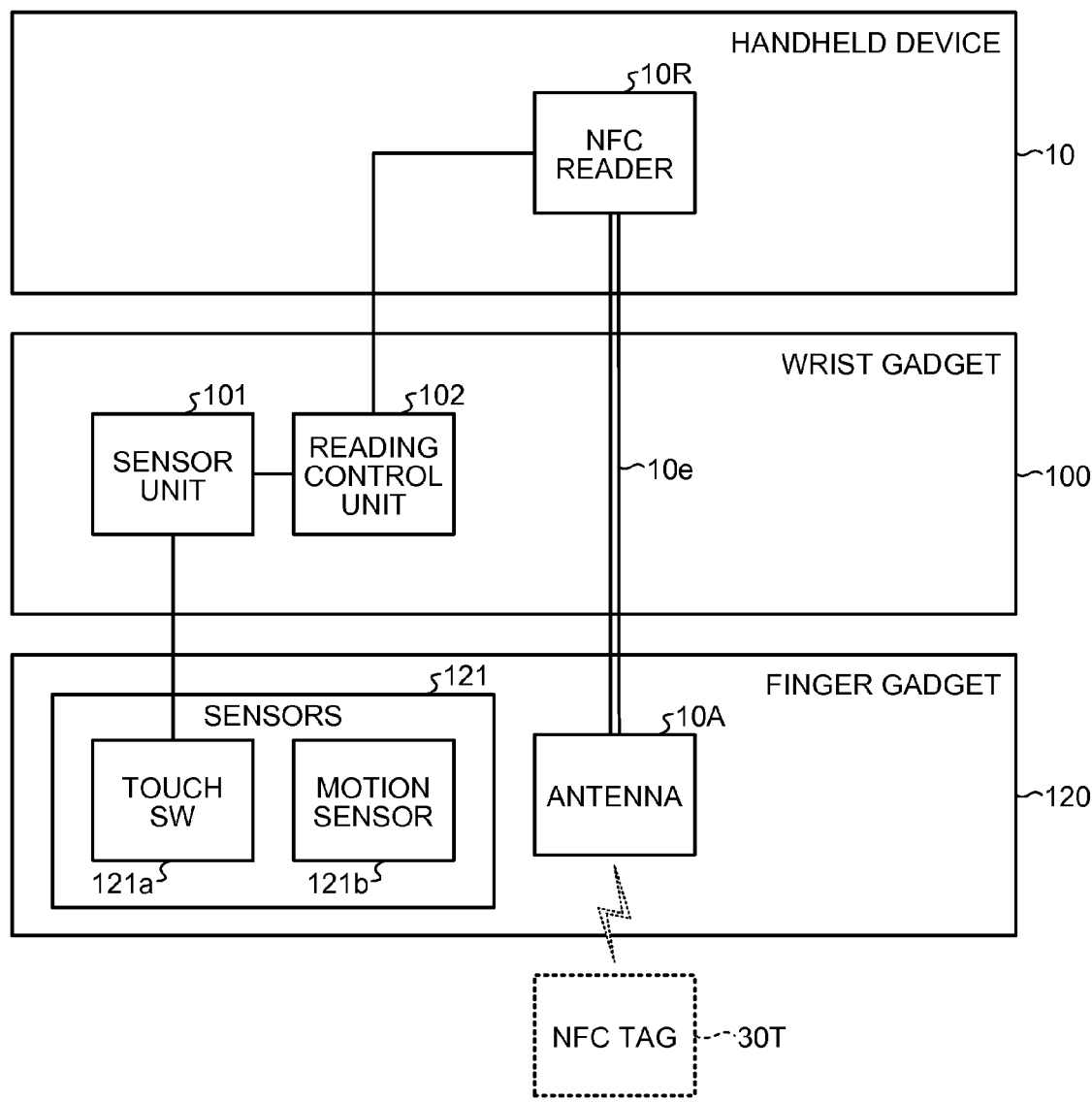
FIG. 2 is a block diagram illustrating functional configurations of devices included in the information reading system according to the first embodiment.

Firstly, the explanation is given about a functional configuration of the finger gadget 120 according to the first embodiment. FIG. 2 is a block diagram illustrating functional configurations of devices included in the information reading system according to the first embodiment. In FIG. 2, block diagrams of the handheld device 10, the wrist gadget 100, and the finger gadget 120 are illustrated. First of all, the explanation is given about a functional configuration of the finger gadget 120.

As illustrated in FIG. 2, the finger gadget 120 includes sensors 121 and the antenna 10A. Moreover, in addition to the functional components illustrated in FIG. 2, the finger gadget 120 includes various functional components, such as a control unit equivalent to a micro processing unit (MPU) or a memory, of a known computer.

The sensors 121 can include arbitrary sensors. For example, the sensors 121 include a touch switch (SW) 121a and a motion sensor 121b.

The touch SW 121a is a mechanical switch that switches between the ON state and the OFF state due to a contact with an external object.

Figure 3:
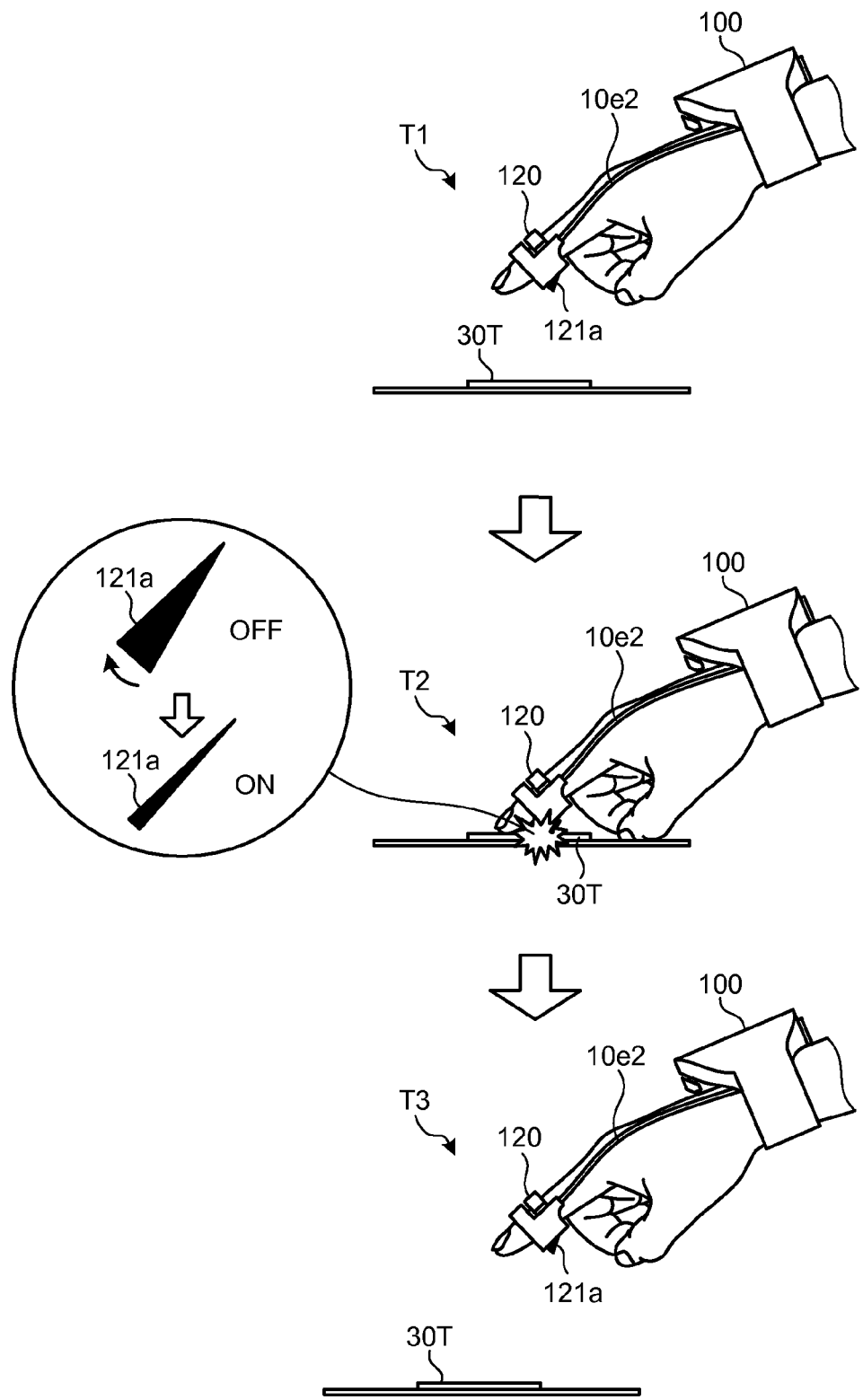
FIG. 3 is a diagram illustrating an exemplary detection method using a touch operation.

FIG. 3 is a diagram illustrating an exemplary detection method using a touch operation. In FIG. 3, the finger gadget 120 is illustrated to be ring-shaped and wearable around the first joint of a finger. As illustrated in FIG. 3, of the periphery of the finger gadget 120, the portion opposite to the ball of the finger of the worker 1 has the touch SW 121a formed thereon. Moreover, the antenna extension cable 10e2 of the antenna extends up to the finger gadget 120 via the wrist gadget 100.

Firstly, at a timing T1, the finger gadget 120 has not reached the NFC tag 30T, and the touch SW 121a is not in contact with any object. For that reason, the touch SW 121a is held in the OFF state. At a timing T2, the finger gadget 120 reaches the NFC tag 30T, and the touch SW 121a makes contact with the NFC tag 30T. Hence, the touch SW 121a gets pressed toward the finger gadget 120 by the NFC tag 30T. With that, the touch SW 121a switches from OFF state to the ON state. Then, as long as the touch SW 121a remains pressed toward the finger gadget 120 by the NFC tag 30T, the touch SW 121a is held in the ON state. Subsequently, at a timing T3, the finger gadget 120 is moved away from the NFC tag 30T, and the touch SW 121a is released from being pressed toward the finger gadget 120 by the NFC tag 30T. With that, the touch SW 121a switches from the ON state to the OFF state.

In this way, when the touch SW 121a is in the OFF state, the possibility that the NFC tag 30T is being touch-operated by the finger gadget 120 can be detected to be low. On the other hand, when the touch SW 121a is in the ON state, the possibility that the NFC tag 30T is being touch-operated by the finger gadget 120 can be detected to be high.

The motion sensor 121b is a sensor for measuring the movements of the finger gadget 120. The motion sensor 121b can be implemented by combining a tri-axial acceleration sensor, a tri-axial gyro sensor, and a tri-axial geomagnetic sensor. If the output of the motion sensor 121b is detected, then it becomes possible to determine the position, the speed, and the orientation of the finger gadget 120. Meanwhile, herein, although the explanation is given about implementing the motion sensor 121b, all three types of sensors are not always implemented. Instead, either one of the acceleration sensor, the gyro sensor, and the geomagnetic sensor can be installed; or any combination of those sensors can be used.

Configuration of Wrist Gadget 100

Given below is the explanation of a functional configuration of the wrist gadget 100 according to the first embodiment. As illustrated in FIG. 2, the wrist gadget 100 includes a sensor unit 101 and a reading control unit 102. Moreover, in addition to the functional components illustrated in FIG. 2, the wrist gadget 100 includes various functional components, such as a control unit equivalent to a micro processing unit (MPU) or a memory, of a known computer.

The sensor unit 101 is a processing unit that detects a touch operation performed with respect to the NFC tag 30T. The sensor unit 101 can monitor the state of the touch SW 121a of the finger gadget 120, and can detect whether or not the finger gadget 120 is touching the NFC tag 30T. For example, when the touch SW 121a is in the OFF state, the sensor unit 101 can detect that the possibility of the NFC tag 30T being touch-operated by the finger gadget 120 is low. On the other hand, when the touch SW 121a is in the ON state, the sensor unit 101 can detect that the possibility of the NFC tag 30T being touch-operated by the finger gadget 120 is high.

The reading control unit 102 is a processing unit that controls the timing at which the NFC reader 10R reads the NFC tag 30T. When the sensor unit 101 detects a touch operation, that is, when the touch SW 121a switches from the OFF state to the ON state; the reading control unit 102 can perform the following operation. That is, the reading control unit 102 instructs the handheld device 10 to drive the NFC reader 10R so as to start reading information from the NFC tag 30T. When the sensor unit 101 no more detects the touch operation, that is, when the touch SW 121a switches from the ON state to the OFF state; the reading control unit 102 can perform the following operation. That is, the reading control unit 102 activates a watchdog timer (WDT) and monitors the timeout. For example, using the WDT, the reading control unit 102 monitors whether or not a predetermined period of time, such as two seconds, has elapsed since the touch SW 121a has switched to the OFF state. When the WDT times out, the reading control unit 102 instructs the handheld device 10 to stop driving the NFC reader 10R so as to end reading information from the NFC tag 30T.

Figure 4:
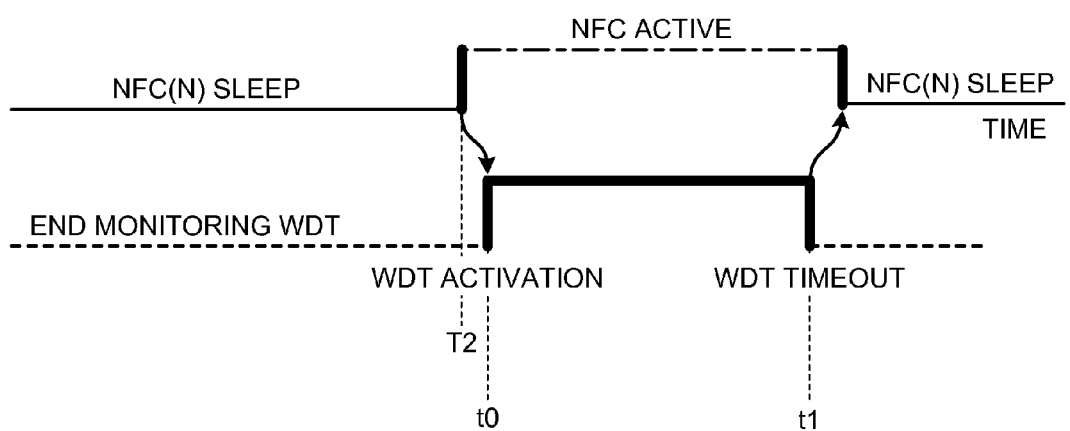
FIG. 4 is a diagram illustrating an exemplary time chart.

FIG. 4 is a diagram illustrating an exemplary time chart. In FIG. 4, a chart related to the sleep state and the active state of the NFC reader 10R is given along with a chart related to the ON state and the OFF state of the timer of the WDT used by the reading control unit 102. Herein, it is assumed that "T2", "t0", and "t1" illustrated in FIG. 4 have the magnitude relationship of "T2<t0<t1". As illustrated in FIG. 4, at the timing T2 at which the touch SW 121a switches from the OFF state to the ON state, the reading control unit 102 issues a driving start instruction to the NFC reader 10R so that the NFC reader 10R switches from the sleep state to the active state. Then, at a timing t0 at which the touch SW 121a switches from the ON state to the OFF state, the reading control unit 102 activates the WDT. Then, at the timing t1, when the WDT times out, the reading control unit 102 issues a driving termination instruction to the NFC reader 10R so that the NFC reader 10R switches from the active state to the sleep state.

In this way, as a result of controlling the start and the end of reading the NFC tag 30T, polling of the NFC reader 10R can be done only during the period of time in which the worker 1 is performing a touch operation performed with respect to the NFC tag 30T using the finger gadget 120. Meanwhile, although the explanation herein is given for the case of controlling the timing of reading performed by the NFC reader 10R; in the case of controlling the timing of writing performed by an NFC writer too, it is possible to issue a driving start instruction and a driving termination instruction to the NFC writer at identical timings as above.

Meanwhile, the sensor unit 101 and the reading control unit 102 can be implemented by executing a reading control program in a micro processing unit (MPU) or a central processing unit (CPU). Alternatively, the sensor unit 101 and the reading control unit 102 can be implemented using a hardware logic such as an application specific integrated circuit (ASIC) or a field programmable gate array (FPGA).

Flow of Operations

Figure 5:
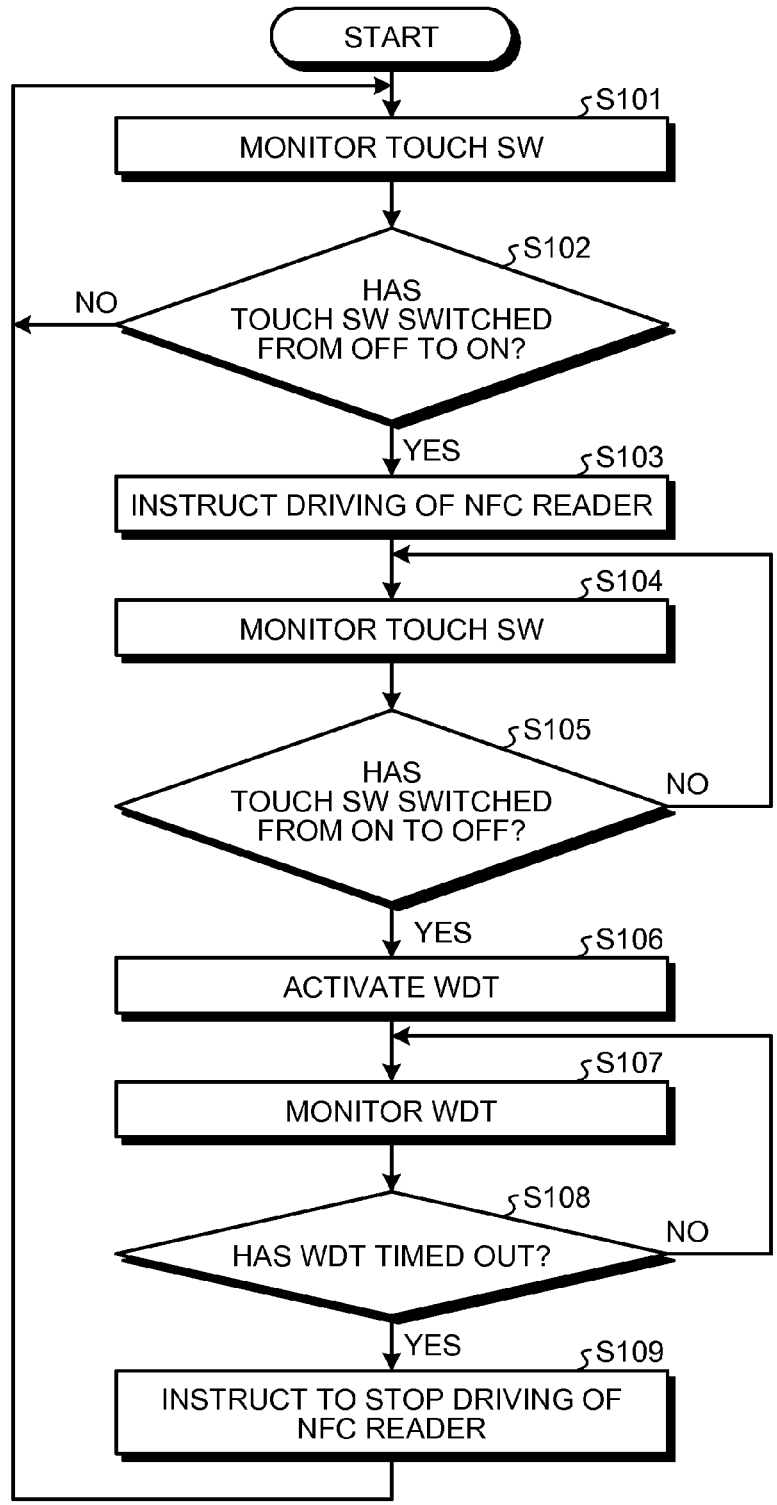
FIG. 5 is a flowchart for explaining a sequence of operations during a reading control operation performed according to the first embodiment.

FIG. 5 is a flowchart for explaining a sequence of operations during a reading control operation performed according to the first embodiment. While the wrist gadget 100 is powered ON, the reading control operation is performed in a repeated manner.

As illustrated in FIG. 5, the sensor unit 101 monitors the state of the touch SW 121a of the finger gadget 120 (Step S101). During the period of time for which the touch SW 121a does not switch from the OFF state to the ON state (No at Step S102), the operation at Step S101 is performed in a repeated manner.

When the touch SW 121a switches from the OFF state to the ON state (Yes at Step S102), the reading control unit 102 performs the following operation. That is, the reading control unit 102 instructs the NFC reader 10R to drive the NFC reader 10R so as to start reading information from the NFC tag 30T (Step S103).

Then, the sensor unit 101 monitors the state of the touch SW 121a of the finger gadget 120 (Step S104). During the period of time for which the touch SW 121a does not switch from the ON state to the OFF state (No at Step S105), the operation at Step S104 is performed in a repeated manner.

When the touch SW 121a switches from the ON state to the OFF state (Yes at Step S105), the reading control unit 102 performs the following operation. That is, the reading control unit 102 activates a WDT (Step S106), and monitors the time out of the WDT (Step S107). Until the WDT times out (No at Step S108), the operation at Step S107 is continually performed.

When the WDT times out (Yes at Step S108), the reading control unit 102 performs the following operation. That is, the reading control unit 102 instructs the handheld device 10 to stop driving the NFC reader 10R so as to end reading information from the NFC tag 30T (Step S109). Then, the system control returns to Step S101.

Effect of First Embodiment

As described above, the wrist gadget 100 according to the first embodiment detects a touch operation performed with respect to the NFC tag 30T and, upon detecting a touch operation, activates the NFC reader 10R so as to start reading information from the NFC tag 30T. Therefore, polling of the NFC reader 10R can be done only during the period of time in which the worker 1 is performing a touch operation performed with respect to the NFC tag 30T using the finger gadget 120. Hence, using the wrist gadget 100 according to the first embodiment, information of the tag can be read at low power.

Application Example of First Embodiment

In the first embodiment, the explanation is given for a case in which the timing of reading performed by the NFC reader 10R is controlled using the touch SW 121a. However, the method of controlling the timing of reading is not limited to the method according to the first embodiment. Alternatively, the timing of reading can be controlled using the output of some other sensor. In that regard, as an application example, the explanation is given about a case in which the timing of reading is controlled using the motion sensor 121b.

For example, the sensor unit 101 monitors the output of the motion sensor 121b, and estimates the movement locus of the finger gadget 120 from the output of the motion sensor 121b. For example, every time the output of the motion sensor 121b is obtained, the sensor unit 101 calculates the position of the finger gadget 120 according to the inertial navigation system. More particularly, every time the output of the motion sensor 121b is obtained, the sensor unit 101 obtains the speed by integrating the acceleration, and obtains the distance by further integrating the speeds. Besides, based on the orientation obtained along with the acceleration, the sensor unit 101 accumulates and synthesizes, for each sampling period, the vectors of movement distance and direction and calculates the movement distance from the initial position. With that, every time the acceleration is sampled by the motion sensor 121b, the record of positions is accumulated. Then, the sensor unit 101 determines whether or not the movement locus of the finger gadget 120, such as the series of sets of position information during a predetermined recent period, represents a path resembling a straight line.

If the movement locus of the finger gadget 120 resembles a straight line, then it can be considered that the worker 1 is moving the finger gadget 120 toward the NFC tag 30T. That is because, when a person moves a finger toward a target, the heuristic is to move the finger toward the target along a path that is roughly close to a straight line. Thus, in this case, the reading control unit 102 issues an instruction to drive the NFC reader 10R at a first polling rate, such as a low polling rate.

After the NFC reader 10R is driven at the first polling rate, the sensor unit 101 monitors the NFC reader 10R as well as monitors the output of the motion sensor 121b.

At that time, if the NFC tag 30T is detected due to the polling of the NFC reader 10R or if the impact shock is detected from the output of the motion sensor 121b, the following can be determined. That is, it can be estimated that the finger gadget 120 and the NFC tag 30T are either close to each other or highly likely to have made contact with each other. In that case, the reading control unit 102 issues an instruction to drive the NFC reader 10R at a second polling rate, such as a high polling rate, that is higher than the first polling rate.

As far as detecting the impact shock is concerned, it is possible to use the acceleration output by the motion sensor 121b. For example, from the time waveform of the acceleration obtained from the motion sensor 121b, the sensor unit 101 removes the direct-current (DC) components, such as the gravity component not undergoing temporal changes, using a high pass filter. Then, from the alternate-current (AC) components obtained as a result, the sensor unit 101 calculates a signal magnitude area (SMA); and compares the SMA with a threshold value to determine whether the finger gadget 120 remains stationary or whether there was an impact shock.

Then, according to the inertial navigation system, the sensor unit 101 detects the distance by which the finger gadget 120 has moved in the direction orthogonal to the plane of contact with the NFC tag 30T. Subsequently, the sensor unit 101 determines whether or not the movement distance in the vertical direction from the plane of contact is equal to or greater than a predetermined threshold value such as 10 cm. If the movement distance in the vertical direction from the plane of contact is equal to or greater than the threshold value, then the reading control unit 102 instructs the handheld device 10 to stop driving the NFC reader 10R so as to end reading information from the NFC tag 30T.

Figure 6:
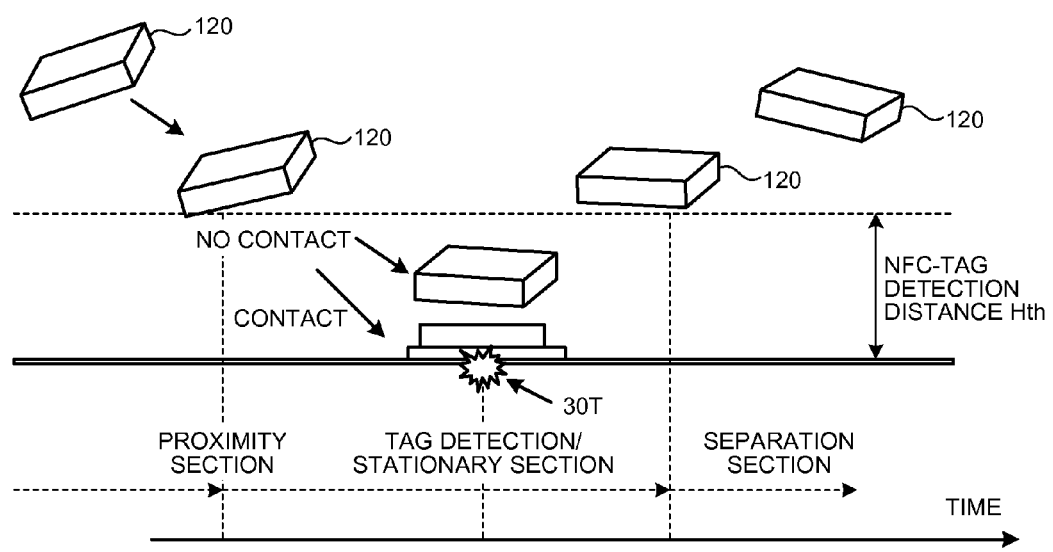
FIG. 6 is a diagram illustrating an exemplary method of controlling the timing of reading according to an application example of the first embodiment.

FIG. 6 is a diagram illustrating an exemplary method of controlling the timing of reading according to the application example of the first embodiment. In FIG. 6, the finger gadget 120 is illustrated as rectangles. As illustrated in FIG. 6, when the movement locus of the finger gadget 120 becomes a path resembling a straight line, it is determined to be a "proximity section" indicating that the finger gadget 120 has moved close to the NFC tag 30T. As a result, the NFC reader 10R is driven at the first polling rate, that is, at the low polling rate.

Then, if the motion sensor 121b detects an impact shock, it is determined to be "tag detection" indicating that the finger gadget 120 is making contact with the NFC tag 30T. As a result, the NFC reader 10R is driven at the second polling rate, that is, at the high polling rate. Meanwhile, even if the motion sensor 121b does not detect any impact shock, if the NFC tag 30T is detected due to the polling of the NFC reader 10R, it is determined to be "tag detection" indicating that the finger gadget 120 is close to but not making contact with the NFC tag 30T. In this case too, the NFC reader 10R is driven at the second polling rate, that is, at the high polling rate.

Meanwhile, if the distance by which the finger gadget 120 has moved in the direction orthogonal to the plane of contact with the NFC tag 30T is smaller than an NFC-tag detection distance Hth illustrated in FIG. 6, it is determined to be a "stationary section" indicating that the finger gadget 120 remains stationary adjacent to the NFC tag 30T. During that period, the NFC reader 10R is driven at the second polling rate without change. Then, if the distance by which the finger gadget 120 has moved in the direction orthogonal to the plane of contact with the NFC tag 30T becomes equal to or greater than the NFC-tag detection distance Hth, it is determined to be a "separation section" indicating that the finger gadget 120 has moved away from the NFC tag 30T. As a result, the driving of the NFC reader 10R is stopped.

Figure 7:
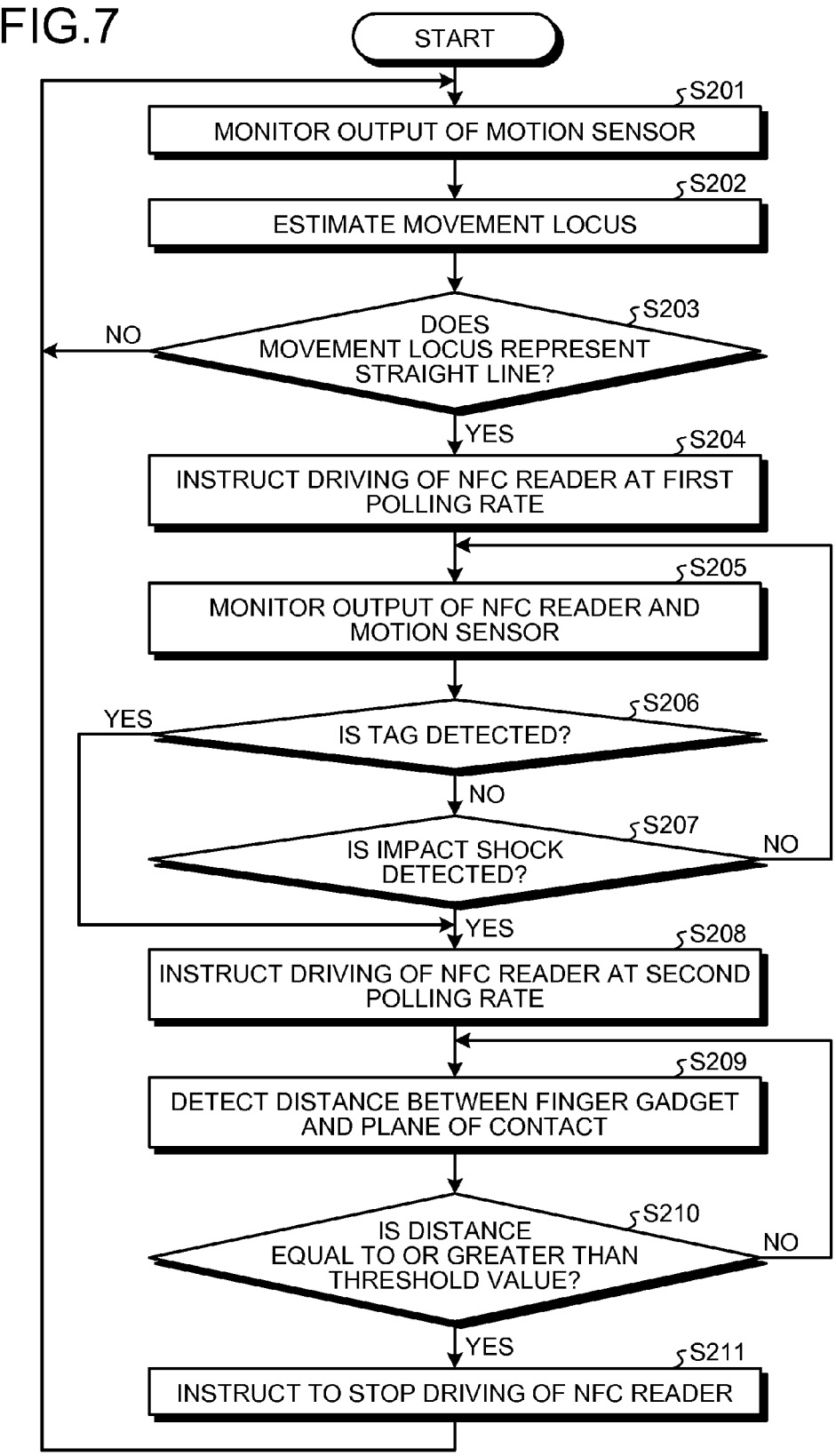
FIG. 7 is a flowchart for explaining a sequence of operations during an information reading operation performed according to the application example of the first embodiment.

FIG. 7 is a flowchart for explaining a sequence of operations during an information reading operation performed according to the application example of the first embodiment. In an identical manner to the information reading operation explained with reference to FIG. 5, the information reading operation explained with reference to FIG. 7 is performed in a repeated manner while the wrist gadget 100 is powered ON.

As illustrated in FIG. 7, the sensor unit 101 monitors the output of the motion sensor 121b (Step S201), and estimates the movement locus of the finger gadget 120 from the output of the motion sensor 121b (Step S202).

Then, the sensor unit 101 determines whether or not the movement locus of the finger gadget 120, such as the series of sets of position information during a predetermined recent period, represents a path resembling a straight line (Step S203). If the movement locus of the finger gadget 120 does not represent a path resembling a straight line (No at Step S203), then the system control returns to Step S201.

On the other hand, if the movement locus of the finger gadget 120 represents a path resembling a straight line (Yes at Step S203), then the reading control unit 102 issues an instruction to drive the NFC reader 10R at the first polling rate, that is, at the low polling rate (Step S204). Subsequently, the sensor unit 101 monitors the NFC reader 10R as well as monitors the output of the motion sensor (Step S205).

Then, if the NFC tag 30T is detected due to the polling of the NFC reader 10R or if an impact shock is detected from the output of the motion sensor 121b (Yes at Step S206 or Yes at Step S207), the following operation is performed. That is, the reading control unit 102 issues an instruction to drive the NFC reader 10R at the second polling rate, such as a high polling rate, that is higher than the first polling rate (Step S208).

On the other hand, if the NFC tag 30T is not detected due to the polling of the NFC reader 10R or if no impact shock is detected from the output of the motion sensor 121b (No at Step S206 or No at Step S207), then the operation at Step S205 is performed in a repeated manner.

Then, according to the inertial navigation system, the sensor unit 101 detects the distance by which the finger gadget 120 has moved in the direction orthogonal to the plane of contact with the NFC tag 30T (Step S209).

Subsequently, the sensor unit 101 determines whether or not the movement distance in the vertical direction from the plane of contact is equal to or greater than a predetermined threshold value such as 10 cm (Step S210). If the movement distance in the vertical direction from the plane of contact is smaller than the threshold value (No at Step S210), then the operation at Step S209 is performed in a repeated manner.

On the other hand, if the movement distance in the vertical direction from the plane of contact is equal to or greater than the threshold value (Yes at Step S210), then the following operation is performed. That is, the reading control unit 102 instructs the handheld device 10 to stop driving the NFC reader 10R (Step S211). Then, the system control returns to Step S201.

Effect of Application Example

As explained in the application example, even when the timing of reading is controlled using the motion sensor 121b, polling of the NFC reader 10R can be done only during the period of time in which the worker 1 is performing a touch operation performed with respect to the NFC tag 30T using the finger gadget 120. Hence, in the wrist gadget 100 according to the application example, information of the tag can be read at low power.

Figure 8:
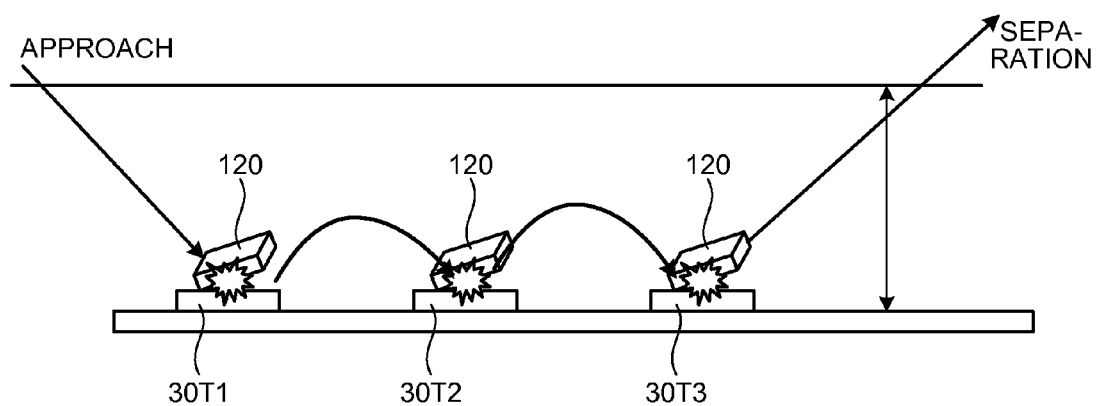
FIG. 8 is a diagram illustrating an exemplary sequence of operations performed for reading a plurality of NFC tags.

Moreover, in the wrist gadget 100 according to the application example, if the movement distance of the finger gadget 120 in the vertical direction from the plane of contact is smaller than a predetermine threshold value, the polling of the NFC reader 10R is maintained at the second polling rate. FIG. 8 is a diagram illustrating an exemplary sequence of operations performed for reading a plurality of NFC tags 30T. In FIG. 8 is illustrated an example in which tag IDs are read from NFC tags 30T1, 30T2, and 30T3 in that order. As illustrated in FIG. 8, in the case of sequentially reading the three NFC tags 30T starting from the NFC tag 30T1 to the NFC tag 30T3, driving and termination of the NFC reader 10R is not repeated every time the finger gadget 120 makes contact with one of the NFC tags 30T. That is, polling of the NFC reader 10R is maintained at the second polling rate. As a result, in the case of sequentially reading a plurality of NFC tags 30T, failure in reading is prevented from occurring.

First Modification Example

In the first embodiment, the explanation is given for an example in which the timing of reading performed by the NFC reader 10R is controlled using the touch SW 121a or the motion sensor 121b. However, it is also possible to control the timing of reading using some other sensor. For example, the wrist gadget 100 can control the timing of reading, which is performed by the NFC reader 10R, by making use of the variation in sound or light.

[b] Second Embodiment

In the first embodiment, the explanation is given for an example in which the NFC reader 10R is driven in response to the detection of a touch operation. In a second embodiment, the explanation is given for an example in which a notification is issued to the worker 1 about the fact that polling is enabled as a result of driving the NFC reader 10R.

Figure 9:
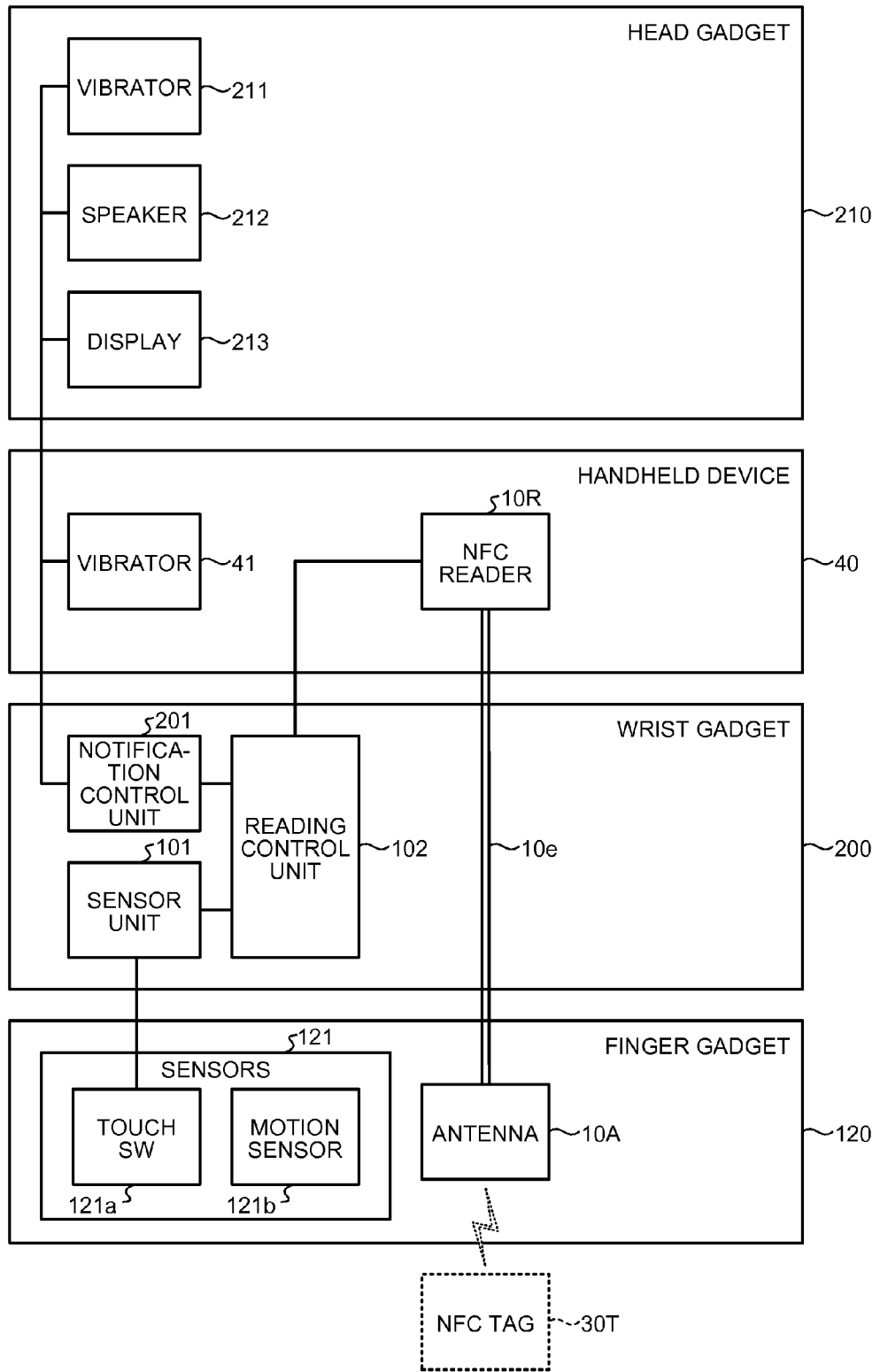
FIG. 9 is a block diagram illustrating functional configurations of devices included in an information reading system according to a second embodiment.

FIG. 9 is a block diagram illustrating functional configurations of devices included in an information reading system according to the second embodiment. As compared to the information reading system illustrated in FIG. 2, the information reading system illustrated in FIG. 9 differs in the way that hardware for outputting the abovementioned notification is illustrated in a head gadget 210 and a handheld device 40, and that a notification control unit 201 is added to a wrist gadget 200 for the purpose of controlling the notification. With reference to FIG. 9, the functional components that implement identical functions to the functional configurations of the devices illustrated in FIG. 2 are referred to by the same reference numerals, and the relevant explanation is not repeated.

The notification control unit 201 is a processing unit that, when the reading control unit 102 drives the NFC reader 10R, issues a notification about the driving of the NFC reader 10R. The notification control unit 201 makes use of various interfaces provided in the handheld device 40, the wrist gadget 100, and the head gadget 110; and issues a notification in the form of display, sound, or vibrations. Herein, the notification control unit 201 can issue a notification about the start of driving the NFC reader 10R; or can issue a notification about the start timing and the end timing of driving the NFC reader 10R; or can issue notifications in a continuous or intermittent manner during a driving section from the start of driving the NFC reader 10R to the end of driving the NFC reader 10R.

For example, over the driving section from the start of driving the NFC reader 10R to the end of driving the NFC reader 10R, the notification control unit 201 outputs a sound in a periodic manner using a speaker 212 of the head gadget 210. Herein, although the explanation is given for a case in which the head gadget 210 is made to output a sound, the handheld device 40 can be alternatively made to output a sound. Moreover, over the driving section mentioned above, the notification control unit 201 periodically drives a vibrator 211 of the head gadget 210 and drives a vibrator 41 of the handheld device 40, so that the head gadget 210 and the handheld device 40 vibrate. Herein, although the explanation is given for an example in which the head gadget 210 and the handheld device 40 are vibrated, it is also possible to vibrate the wrist gadget 100.

Figure 10:
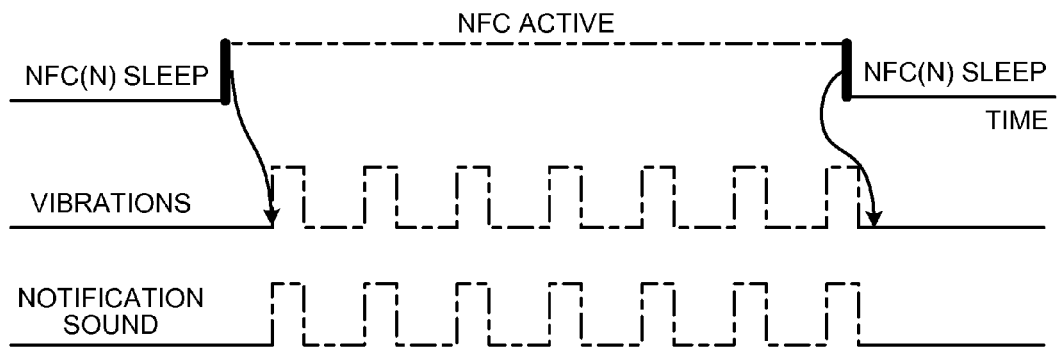
FIG. 10 is a diagram illustrating an exemplary notification issued using a sound and vibrations.

FIG. 10 is a diagram illustrating an exemplary notification issued using a sound and vibrations. As illustrated in FIG. 10, when the reading control unit 102 starts driving the NFC reader 10R, pulses for driving the vibrator 211 and the speaker 212 of the head gadget 210 and pulses for driving the vibrator 41 of the handheld device 40 are periodically output in tandem with the driving of the NFC reader 10R. Subsequently, when the reading control unit 102 stops driving the NFC reader 10R, the supply of pulses to the head gadget 210 and the handheld device 40 is also stopped. By performing such control, the head gadget 210 and the handheld device 40 vibrate at a constant frequency over the driving section mentioned above, and the speaker 212 of the head gadget 210 is made to output a sound at a constant frequency over the driving section mentioned above.

Figure 11:
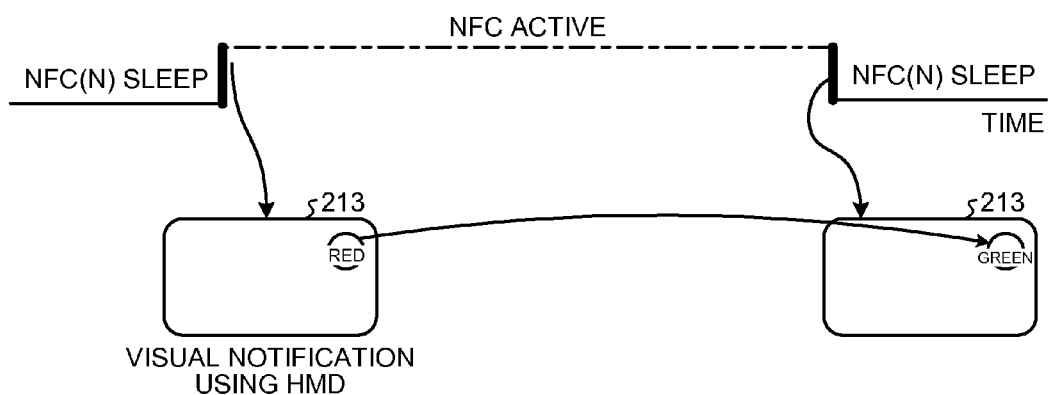
FIG. 11 is a diagram illustrating an exemplary notification issued using a display.

Furthermore, over the driving section mentioned above, the notification control unit 201 outputs, on a display 213 of the head gadget 210, a display such as to output a mark or a message indicating the driving of the NFC reader 10R. FIG. 11 is a diagram illustrating an exemplary notification issued using a display. As illustrated in FIG. 11, while the NFC reader 10R is not driven, a red circle is displayed on the display 213 of the head gadget 210. When the driving of the NFC reader 10R is started, the red circle displayed on the display 213 of the head gadget 210 is changed to a green circle. Then, while the driving of the NFC reader 10R goes on, the green circle is continually displayed on the display 213 of the head gadget 210. When the driving of the NFC reader 10R is stopped, the green circle displayed on the display 213 of the head gadget 210 is changed back to a red circle. Herein, with reference to FIG. 11, the explanation is given for an example in which the display format after stopping the NFC reader 10R is different than the display format while driving the NFC reader 10R. However, alternatively, the display can be performed only when the NFC reader 10R is driven.

Effect of Second Embodiment

As described above, the wrist gadget 200 according to the second embodiment issues a notification to the worker 1 about the fact that polling is enabled as a result of driving the NFC reader 10R. Therefore, the fact that the NFC tag 30T has become readable can be made recognizable while the inspection task is underway. For that reason, for example, it becomes possible to prevent mistaken assumption about the completion of reading the NFC tag 30T in spite of the fact that polling is not performed by the NFC reader 10R. Thus, because of using the wrist gadget 200 according to the second embodiment, mistakes can be prevented from occurring during the task.

Application Example of Second Embodiment

Figure 12:
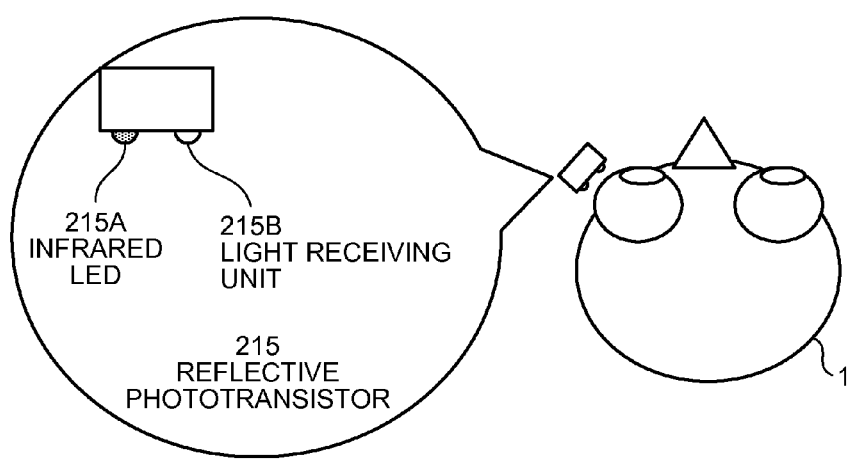
FIG. 12 is a diagram illustrating an installation example of a reflective phototransistor.

As an application example of the second embodiment, the display on the display 213 of the head gadget 210 can be controlled in tandem with the line of sight of the worker 1, for example, in tandem with blinking or glancing performed by the worker 1. FIG. 12 is a diagram illustrating an installation example of a reflective phototransistor 215. Herein, for the purpose of illustration, although the display 213 is not illustrated in FIG. 12, the reflective phototransistor 215 is installed alongside or inside the display 213.

For example, if a non-transmissive HMD is used as the head gadget 210, then the eyepiece surface of the display 213 is designed to face the position extending to the left side surface or the right side surface of the face of the worker 1 wearing the head gadget 210. In this case, at the position illustrated in FIG. 12, the reflective phototransistor 215 including an infrared LED 215A, which emits infrared light, and a light receiving unit 215B, which receives the reflected light of the infrared light, is installed alongside or inside the head gadget 210.

Using the time waveform obtained by the light receiving unit 215B, blinking or glancing performed by the worker 1 can be detected by the processor of the head gadget 210, or the processor of the handheld device 40, or the processor of the wrist gadget 200.

Figure 13:
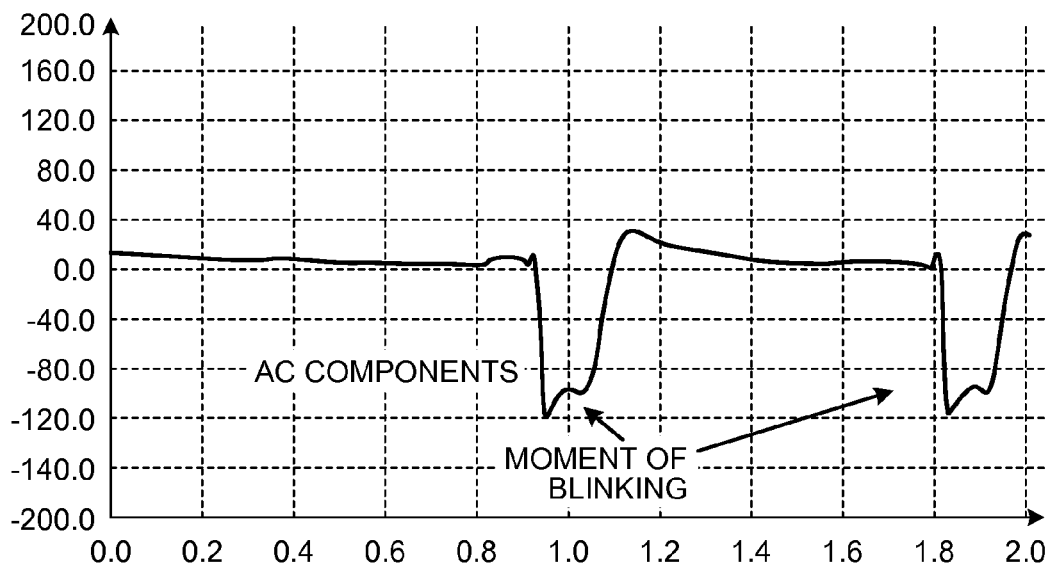
FIGS. 13 and 14 are diagrams illustrating exemplary time waveforms of AC components.
Figure 14:
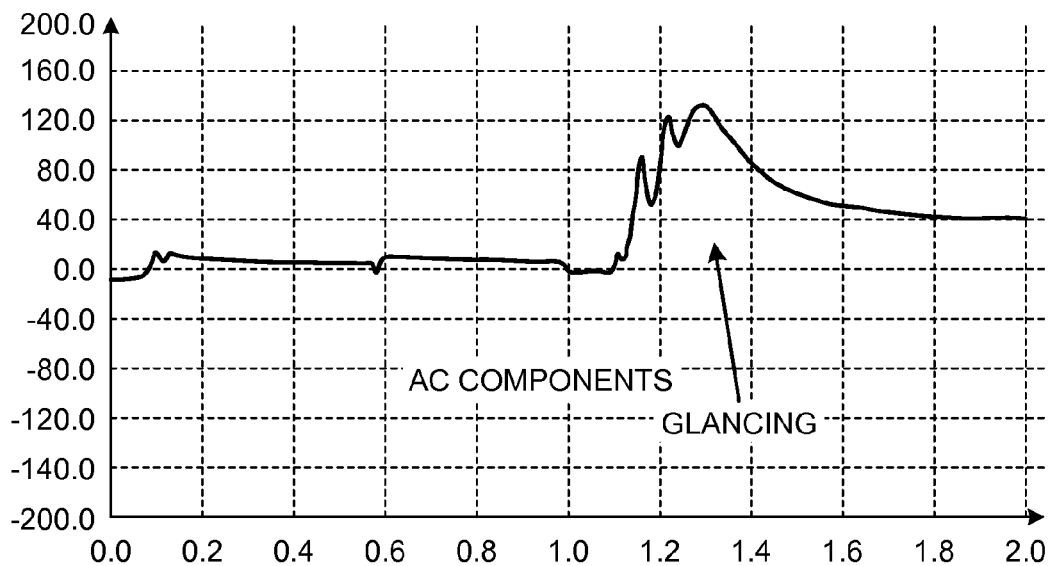

FIGS. 13 and 14 are diagrams illustrating exemplary time waveforms of AC components. In FIGS. 13 and 14, the vertical axis represents the amplitude and the horizontal axis represents the time. In FIG. 13 are illustrated blinking portions obtained with reference to a heartbeat sensor. In FIG. 14 is illustrated a glancing portion obtained with reference to a heartbeat sensor. As illustrated in FIG. 13, when the worker 1 blinks, it can be seen that the amplitude of AC components of the signals obtained from the light receiving unit 215B decreases only locally. On the other hand, as illustrated in FIG. 14, when the worker 1 casts a glance, it can be seen that the amplitude of AC components of the signals obtained from the light receiving unit 215B increases only locally. Thus, if monitoring is done about whether or not the amplitude of the AC components decreases by a value equal to or greater than a predetermined threshold value, it is possible to detect "blinking". Similarly, if monitoring is done about whether or not the amplitude of the AC components increases by a value equal to or greater than a predetermined threshold value, it is possible to detect "glancing".

As a result of detecting "blinking" or "glancing" in the manner described above, the following display control can be achieved. For example, if "glancing" is detected, the display 213 is enabled, that is, switched ON for display purposes. During the period from detection of "glancing" to detection of the next "glancing", the display 213 is kept enabled for display purposes. When the next "glancing" is detected, the display 213 is disabled, that is, switched OFF for display. With that, the display can be enabled only during the period of time in which the worker 1 is looking at the display 213. That enables achieving reduction in the electrical power used by the display 213. Besides, using the detection of "blinking", it also becomes possible to determine the level of fatigue of the worker 1, or to determine the level of awareness of the worker 1, or to determine whether or not the worker 1 is staring at a particular position. Moreover, using the detection of "glancing", the worker 1 can be notified about the presence of information by flashing a visible light LED.

[c] Third Embodiment

In the first embodiment, the explanation is given for an example in which operations including the reading control are performed in the operating state of the devices included in the information reading system. However, each device need not be running all the time. In that regard, in a third embodiment, the explanation is given about an example in which lower-level devices adaptively switch higher-level devices to the operating state.

Figure 15:
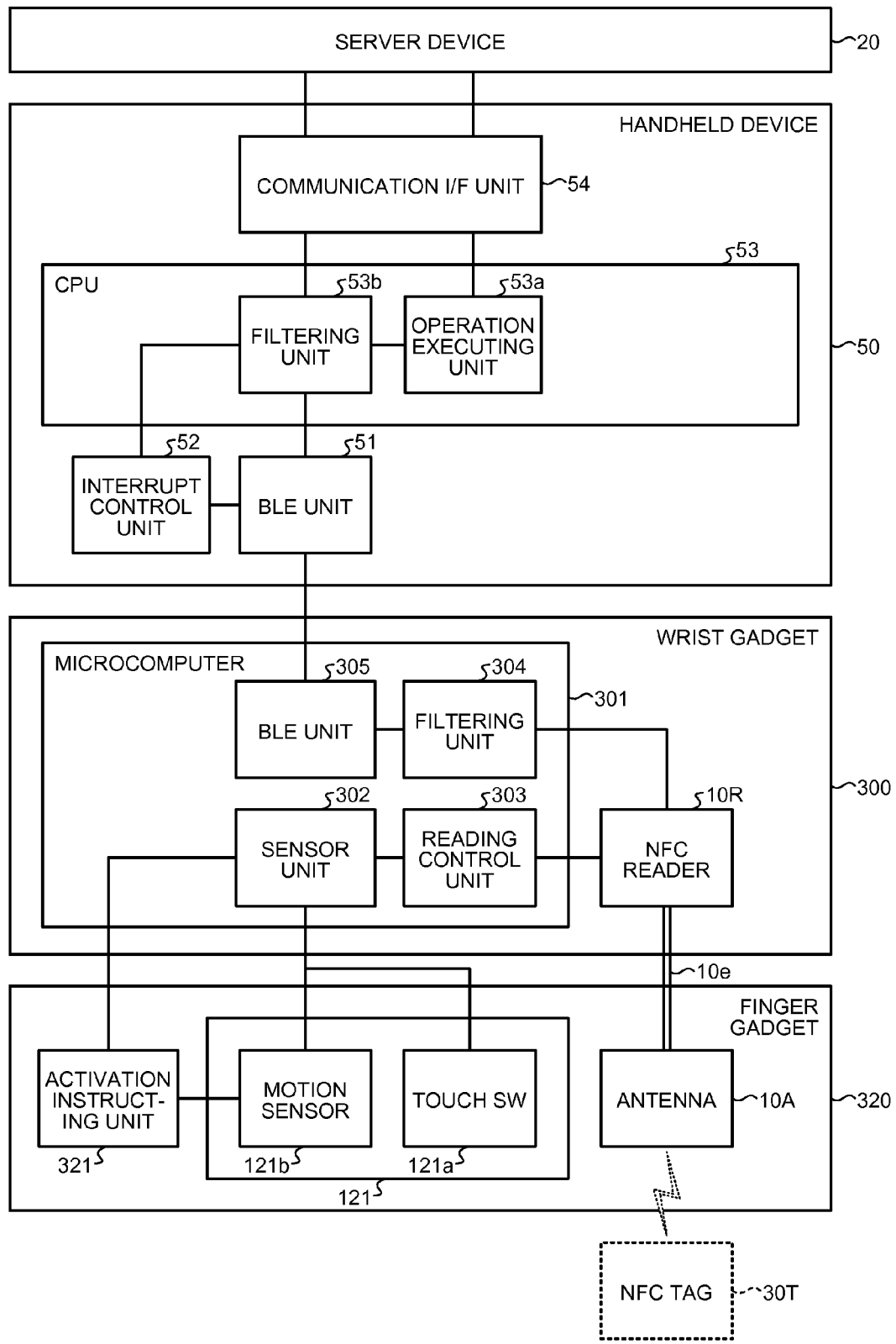
FIG. 15 is a block diagram illustrating functional configurations of devices included in an information reading system according to a third embodiment.

FIG. 15 is a block diagram illustrating functional configurations of devices included in an information reading system according to the third embodiment. In FIG. 15, functional configurations of the server device 20, a handheld device 50, a wrist gadget 300, and a finger gadget 320 are illustrated in descending order of levels of a hierarchical structure. Herein, it is assumed that each device illustrated in FIG. 15 remains in the sleep state until an instruction for returning from the sleep state is received from the immediate lower-level device. With reference to FIG. 15 too, the functional components that implement identical functions to the functional configurations of the devices illustrated in FIG. 2 are referred to by the same reference numerals, and the relevant explanation is not repeated.

Configuration of Finger Gadget 320

As illustrated in FIG. 15, as compared to the finger gadget 120 illustrated in FIG. 2, the finger gadget 320 additionally includes an activation instructing unit 321 that is a processing unit for instructing activation of a microcomputer 301 of the wrist gadget 300 when a predetermined condition is satisfied. As an example, the activation instructing unit 321 monitors the acceleration output by the motion sensor 121b. For example, from the time waveform output by the motion sensor 121b, the activation instructing unit 321 removes the DC components so as to remove the components detected by gravity. Then, from the AC components obtained by removing the DC components, the activation instructing unit 321 calculates an SMA. If the SMA level is equal to or greater than a predetermined threshold value, then the activation instructing unit 321 sends a trigger signal as an instruction for returning from the sleep state to the microcomputer 301 of the wrist gadget 300. As the threshold value, as an example, a value is set which enables estimation of the fact that the finger gadget 320 is not in the stationary state. In this way, the activation instructing unit 321 makes the wrist gadget 300, which is the higher-level device of the finger gadget 320, return from the sleep state only if the finger gadget 320 is estimated to be in the operating state. As a result, only when the worker 1 intends to perform a task, he or she can instruct the wrist gadget 300 to return from the sleep state. That enables achieving reduction in power consumption of the information reading system.

Configuration of Wrist Gadget 300

As illustrating in FIG. 15, as compared to the wrist gadget 100 illustrated in FIG. 2, the wrist gadget 300 differs in the way that the microcomputer 301 having a built-in BLE is illustrated as hardware. Moreover, in the information reading system illustrated in FIG. 2, the explanation is given for an example in which the NFC reader 10R is built into the handheld device 10. However, the NFC reader 10R can be installed in any device. In the information reading system illustrated in FIG. 15, the NFC reader 10R is installed in the wrist gadget 300. The following explanation is given under that assumption.

The microcomputer 301 illustrated in FIG. 15 includes a sensor unit 302, a reading control unit 303, a filtering unit 304, and a BLE unit 305.

The sensor unit 302 and the reading control unit 303 remain in the sleep state until a trigger signal is received as an activation instruction from the activation instructing unit 321. That aspect is different than the sensor unit 101 and the reading control unit 102 illustrated in FIG. 2. After the sensor unit 302 and the reading control unit 303 return from the sleep state, the operations such as the reading control operation are performed in an identical manner as described earlier.

The filtering unit 304 is a processing unit that performs filtering about whether or not to notify the handheld device 50, which is the higher-level device of the wrist gadget 300, about the information read from the NFC tag 30T.

When the NFC reader 10R reads the tag ID from the NFC tag 30T, the filtering unit 304 refers to inspection tag data stored in an internal memory (not illustrated). As an example, the inspection tag data can be a list of tag IDs of the NFC tags 30T associated to the devices 30 to be inspected. If the tag ID read by the NFC tag 30T is registered in the inspection tag data, the device 30 corresponding to that tag ID is treated as the target device for inspection; and it can be noticed that there is room for notifying the handheld device 50, which is the higher-level device, about the concerned tag ID. In that case, the filtering unit 304 further determines whether or not the concerned tag ID is identical to the tag ID read on the last occasion from the NFC tag 30T. If the concerned tag ID is not identical to the tag ID read on the last occasion from the NFC tag 30T, then there is no risk of the identical information getting uploaded redundantly. Hence, in this case, the filtering unit 304 notifies the handheld device 50 about the concerned tag ID via the BLE unit 305. Meanwhile, if the tag ID read from the NFC tag 30T is not registered in the inspection tag data, the device 30 corresponding to the concerned tag ID is not treated as the target device for inspection; and the concern is that the worker 1 is not permitted to handle the device 30. In that case, the filtering unit 304 does not notify the handheld device 50, which is the higher-level device, about the concerned tag ID. Moreover, if the concerned tag ID is identical to the tag ID read on the last occasion from the NFC tag 30T, then there is a risk of the identical information getting uploaded redundantly. In that case too, the filtering unit 304 does not notify the handheld device 50, which is the higher-level device, about the concerned tag ID.

The BLE unit 305 is a processing unit that performs BLE communication with a BLE unit 51 of the handheld device 50. If the tag ID read from the NFC tag 30T is registered in the inspection tag data and if the filtering unit 304 has determined that the concerned tag ID is not identical to the tag ID read on the last occasion from the NFC tag 30T; then the BLE unit 305 sends the tag ID, which is read from the NFC tag 30T, to the BLE unit 51. At that time, if there is no link established with the BLE unit 51, the BLE unit 305 attaches an activation command as well as the tag ID read from the NFC tag 30T to an advertising packet, and sends the advertising packet to the BLE unit 51.

Configuration of Handheld Device 50

As illustrated in FIG. 15, the handheld device 50 includes the BLE unit 51, an interrupt control unit 52, a CPU 53, and a communication interface (I/F) unit 54.

The BLE unit 51 is a processing unit that performs BLE communication with the BLE unit 305 of the wrist gadget 300. For example, the BLE unit 51 receives the tag ID sent by the BLE unit 305.

The interrupt control unit 52 is a processing unit that performs interrupt control with respect to the CPU 53. When the handheld device 50 is in the sleep state, the interrupt control unit 52 scans an advertising packet, which is sent by the BLE unit 305, at a lower communication rate than the communication rate when the link is established. If the advertising packet has an activation command attached thereto, then the interrupt control unit 52 issues an interrupt to the CPU 53 according to the activation command and makes the CPU 53 return from the sleep state. As a result, the CPU 53 obtains, via the BLE unit 51, the tag ID attached to the advertising packet.

Figure 16:
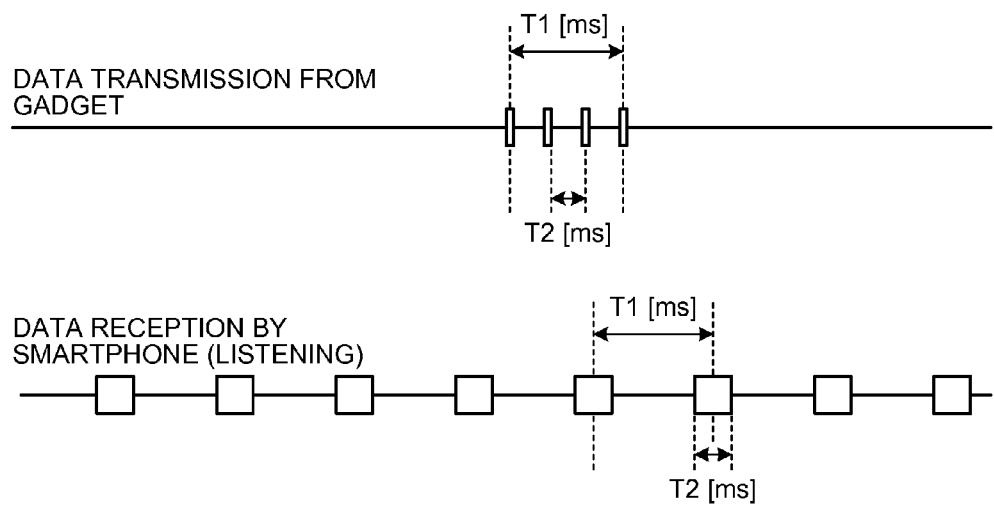
FIG. 16 is a diagram illustrating exemplary transmission timings and reception timings during the sleep state.

FIG. 16 is a diagram illustrating exemplary transmission timings and reception timings during the sleep state. As illustrated in FIG. 16, when the CPU 53 is in the sleep state, the interrupt control unit 52 of the handheld device 50 scans an advertising packet at intervals T1 (milliseconds). At that time, for each instance of scanning, the interrupt control unit 52 takes a time length T2 (milliseconds). On the other hand, in the case of making the CPU 53 of the handheld device 50 return from the sleep state, the BLE unit 305 of the wrist gadget 300 sends a first advertising packet, and then sends advertising packets having an activation command attached thereto at intervals of T2 (milliseconds) until the elapse of the period of time T1 (milliseconds). With that, the handheld device 50 need not keep the link with the BLE unit 305 established during the sleep state. As a result, the power consumption of the handheld device 50 can be cut down. Meanwhile, the functions of the interrupt control unit 52 can be implemented using a dedicated microcomputer, or can be implemented as firmware of the BLE unit 51.

The CPU 53 includes an operation executing unit 53a and a filtering unit 53b.

The operation executing unit 53a is a processing unit that performs various operations related to providing the task support. For example, the operation executing unit 53a displays, on a map, the position corresponding to the target device 30 for inspection; and displays, on the head gadget 110, inspection information of the device 30 that corresponds to the tag ID received from the wrist gadget 300. Meanwhile, the following explanation is given under the assumption that map information of each floor of a facility and inspection information about the target devices for inspection is downloaded on a floor-by-floor basis from the server device 20.

The filtering unit 53b is a processing unit that performs filtering about whether or not to notify the server device 20, which is a higher-level device of the handheld device 50, about the data. When a tag ID is received from the wrist gadget 300, the filtering unit 53b refers to a download list stored in an internal memory (not illustrated). As an example, the download list can be a list of tag IDs of the NFC tags 30T for which the inspection information has already been downloaded from the server device 20. If the tag ID received from the wrist gadget 300 is not registered in the download list, then the filtering unit 53b instructs the server device 20 to return from the sleep mode and downloads, from the server device 20, the inspection information and the map information related to the floor at which the device 30 corresponding to the concerned tag ID is installed.

Flow of Operations

Given below is the explanation of a flow of operations performed in the information processing system according to the third embodiment. Herein, firstly, the explanation is given about (1) first-type return control operation performed by the wrist gadget 300. That is followed by the explanation about (2) second-type return control operation performed by the handheld device 50.

(1) First-Type Return Control Operation

Figure 17:
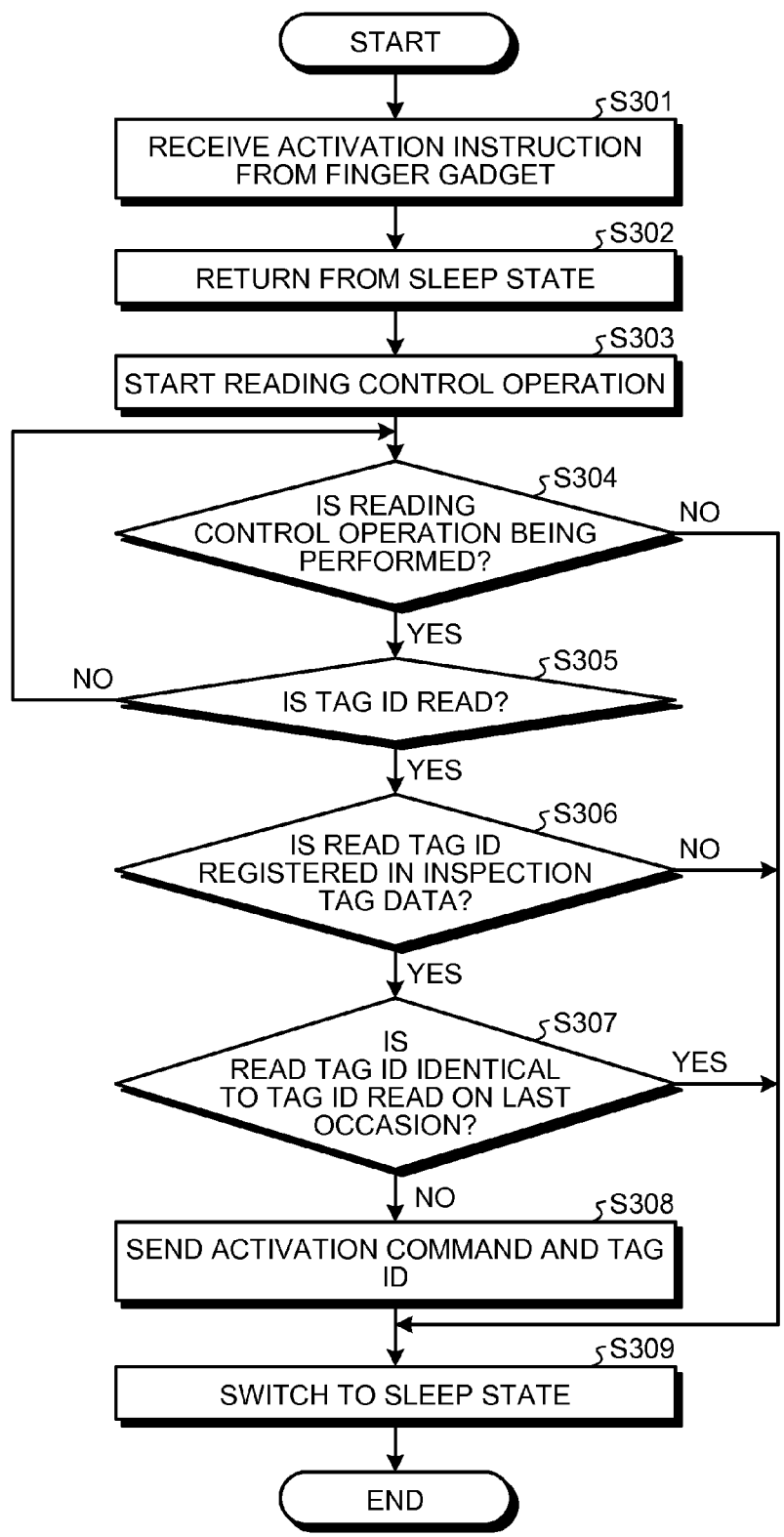
FIG. 17 is a flowchart for explaining a sequence of operations during a first-type return control operation performed according to the third embodiment.

FIG. 17 is a flowchart for explaining a sequence of operations during a first-type return control operation performed according to the third embodiment. This return control operation is performed by the wrist gadget 300 in response to an activation instruction received from the activation instructing unit 321 of the finger gadget 320.

As illustrated in FIG. 17, upon receiving an activation instruction (Step S301), the microcomputer 301 returns from the sleep state (Step S302). Then, the reading control operation performed by the sensor unit 302 and the reading control unit 303 with reference to FIG. 5 is started in a separate thread (Step S303).

Subsequently, while the reading control operation is being performed in a separate thread (Yes at Step S304), the filtering unit 304 monitors whether or not a tag ID is read by the NFC reader 10R (Step S305). When the reading control operation performed in a separate thread is completed (No at Step S304), the system control proceeds to Step S309 described later.

Meanwhile, when a tag ID is read by the NFC reader 10R (Yes at Step S305), the filtering unit 304 determines whether or not the tag ID read from the NFC tag 30T is registered in the inspection tag data (Step S306).

If the tag ID is registered in the inspection tag data (Yes at Step S306), the device 30 corresponding to that tag ID is treated as the target device for inspection; and it can be noticed that there is room for notifying the handheld device 50, which is the higher-level device, about the concerned tag ID. In that case, the filtering unit 304 further determines whether or not the concerned tag ID is identical to the tag ID read on the last occasion from the NFC tag 30T (Step S307).

If the concerned tag ID is not identical to the tag ID read on the last occasion from the NFC tag 30T (No at Step S307), then there is no risk of the identical information getting uploaded redundantly. In this case, the BLE unit 305 attaches an activation command as well as the tag ID read from the NFC tag 30T to an advertising packet, and sends the advertising packet to the BLE unit 51 (Step S308). Subsequently, the microcomputer 301 switches to the sleep state (Step S309). That marks the end of the operations.

Meanwhile, if the tag ID is not registered in the inspection tag data (No at Step S306), then the device 30 corresponding to that tag ID is not treated as the target device for inspection; and the concern is that the worker 1 is not permitted to handle the device 30. In that case, the handheld device 50, which is the higher-level device, is not notified about the concerned tag ID. Thus, the microcomputer 301 switches to the sleep state (Step S309). That marks the end of the operations.

Moreover, if the concerned tag ID is identical to the tag ID read on the last occasion from the NFC tag 30T (Yes at Step S307), then there is a risk of the identical information getting uploaded redundantly. In this case too, the handheld device 50, which is the higher-level device, is not notified about the concerned tag ID. Thus, the microcomputer 301 switches to the sleep state (Step S309). That marks the end of the operations.

(2) Second-Type Return Control Operation

Figure 18:
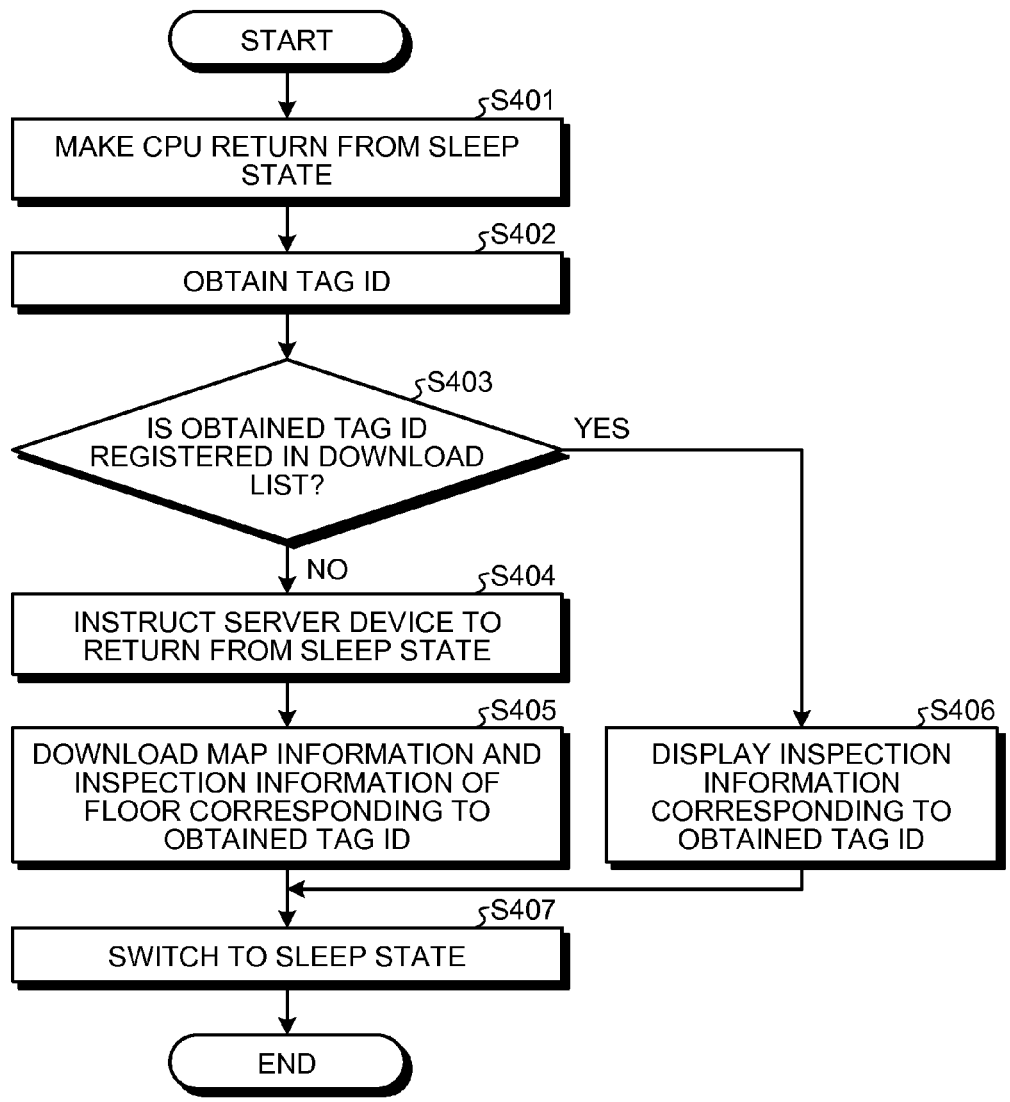
FIG. 18 is a flowchart for explaining a sequence of operations during a second-type return control operation performed according to the third embodiment.

FIG. 18 is a flowchart for explaining a sequence of operations during a second-type return control operation performed according to the third embodiment. This operation is performed by the handheld device 50 in the case in which an activation command could be scanned in an advertising packet send by the BLE unit 305 of the wrist gadget 300.

As illustrated in FIG. 18, according to the activation command attached to the advertising packet, the interrupt control unit 52 issues an interrupt to the CPU 53 and makes the CPU 53 return from the sleep state (Step S401).

Then, the filtering unit 53b obtains the tag ID attached to the advertising packet (Step S402). Subsequently, the filtering unit 53b determines whether or not the tag ID obtained at Step S402 is registered in the download list stored in an internal memory (Step S403).

If the tag ID is not registered in the download list (No at Step S403), then the filtering unit 53b instructs the server device 20 to return from the sleep state (Step S404). Then, the filtering unit 53b downloads, from the server device 20, the inspection information and the map information related to the floor at which the device 30 corresponding to the concerned tag ID is installed (Step S405).

Meanwhile, if the concerned tag ID is registered in the download lost (Yes at Step S403), then the operation executing unit 53a displays, on the head gadget 110, the inspection information of the device 30 corresponding to the tag ID (Step S406).

After the operation at Step S405 or Step S406 is performed, the CPU 53 switches to the sleep state (Step S407). That marks the end of the operations.

Effect of Third Embodiment

As described above, the wrist gadget 300 and the handheld device 50 according to the third embodiment adaptively switch the respective higher-level devices to the operating state from the sleep state. Thus, using the wrist gadget 300 and the handheld device 50 according to the third embodiment, it becomes possible to achieve reduction in the power consumption of the information reading system.

[d] Fourth Embodiment

In a fourth embodiment, the explanation is given for an example of providing the task support in which the target position for moving the device, which corresponds to the tag ID read from the NFC tag 30T, is displayed in a superimposed manner on the head gadget using an augmented reality (AR) marker.

Figure 19:
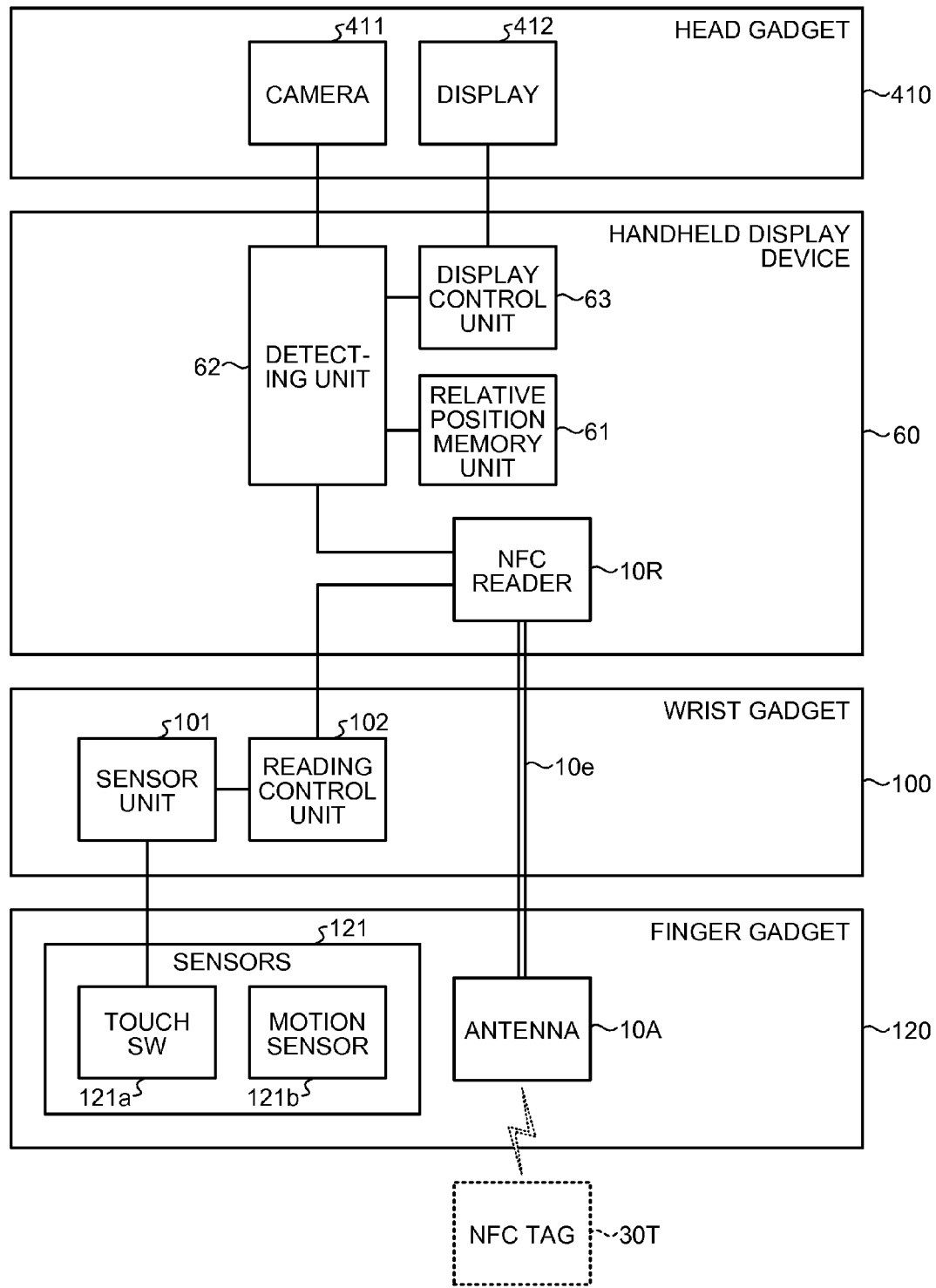
FIG. 19 is a block diagram illustrating functional configurations of devices included in an information reading system according to a fourth embodiment.

FIG. 19 is a block diagram illustrating functional configurations of devices included in an information reading system according to the fourth embodiment. As compared to the information reading system illustrated in FIG. 2, the information reading system illustrated in FIG. 19 differs in the way that hardware related to the abovementioned task support is illustrated in a head gadget 410 and that a functional component related to the abovementioned task support is included in a handheld device 60. With reference to FIG. 19, the functional components that implement identical functions to the functional configurations of the devices illustrated in FIG. 2 are referred to by the same reference numerals, and the relevant explanation is not repeated.

The head gadget 410 illustrated in FIG. 19 includes a camera 411 and a display 412.

The camera 411 is an imaging device having an imaging element, such as a charge coupled device (CCD) or a complementary metal oxide semiconductor (CMOS), installed therein. For example, the camera 411 can have a plurality of light receiving elements of red (R), green (G), and blue (B) colors. In order to ensure that the camera 411 provides the substantially identical field of view to the field of view available to the worker 1 through the display 412 of the head gadget 410, the camera 411 is installed alongside or inside the head gadget 410.

The display 412 is a display device for displaying a variety of information such as AR information. Herein, the display 412 can be a transmissive head-mounted display.

As illustrated in FIG. 19, the handheld device 60 includes a relative position memory unit 61, a detecting unit 62, and a display control unit 63.

The relative position memory unit 61 is used to store, for each tag ID, a relative position that represents the target position to which the worker 1 is made to move the device corresponding to the concerned tag ID and that is expressed by comparison with an AR marker.

The detecting unit 62 is a processing unit for detecting an AR marker. The detecting unit 62 determines whether or not the tag ID, which is read from the NFC tag 30T by the NFC reader 10R, is registered in the relative position memory unit 61. If the concerned tag ID is registered in the relative position memory unit 61; then, every time the camera 411 takes a camera image, the detecting unit 62 detects an AR marker, such as a quick response (QR) code, from the camera image.

The display control unit 63 is a processing unit for performing display control with respect to the display 412 of the head gadget 410. When the detecting unit 62 detects an AR marker from a camera image, the display control unit 63 reads, from among the relative positions stored in the relative position memory unit 61, the relative position corresponding to the concerned tag ID. Then, with reference to the position of the AR marker in the camera image displayed on the display 412, the display control unit 63 displays, in a superimposed manner, the AR information at the relative position corresponding to the concerned tag ID from the reference position.

Figure 20:
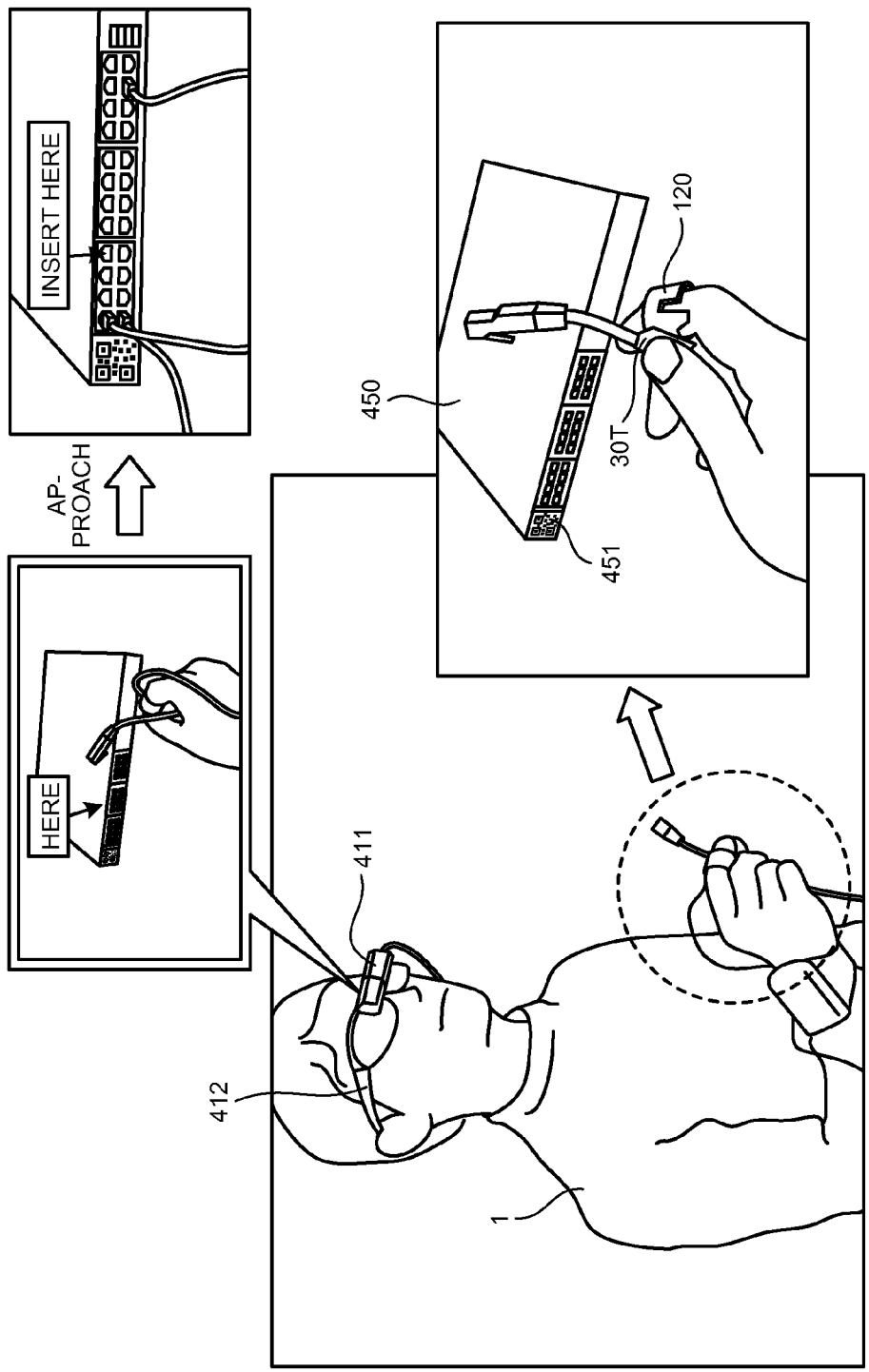
FIG. 20 is a diagram illustrating a specific example related to the display of AR information.

FIG. 20 is a diagram illustrating a specific example related to the display of AR information. In FIG. 20 is illustrated a situation in which the worker 1 inserts, in a modular jack, a cord to which the NFC tag 30T is attached. As illustrated in FIG. 20, when the worker 1 brings the NFC tag 30T, which is attached to the cord, into contact with the finger gadget 120; the relative position between a modular jack of a network device 450 in which the cord is to be inserted and the AR marker, such as a position at 10 cm in the right-hand direction from an AR marker 451, is read from the relative position memory unit 61. Subsequently, when the AR marker 451, which is attached to the network device 450, enters the field of view available to the worker 1 through the head-mounted display, and when the AR marker 451 is detected from a camera image taken by the camera 411; AR information, such as an arrow "↓" and a message "here", is displayed at the relative position corresponding to the concerned tag ID from the position of the AR marker 451 in the camera image being displayed on the display 412. Moreover, if the worker 1 moves closer to the network device 450 so that the AR marker 451 captured in the camera image becomes equal to or greater than a predetermined size, more detailed AR information, such as an arrow "↓" and a message "insert here", is displayed.

Figure 21:
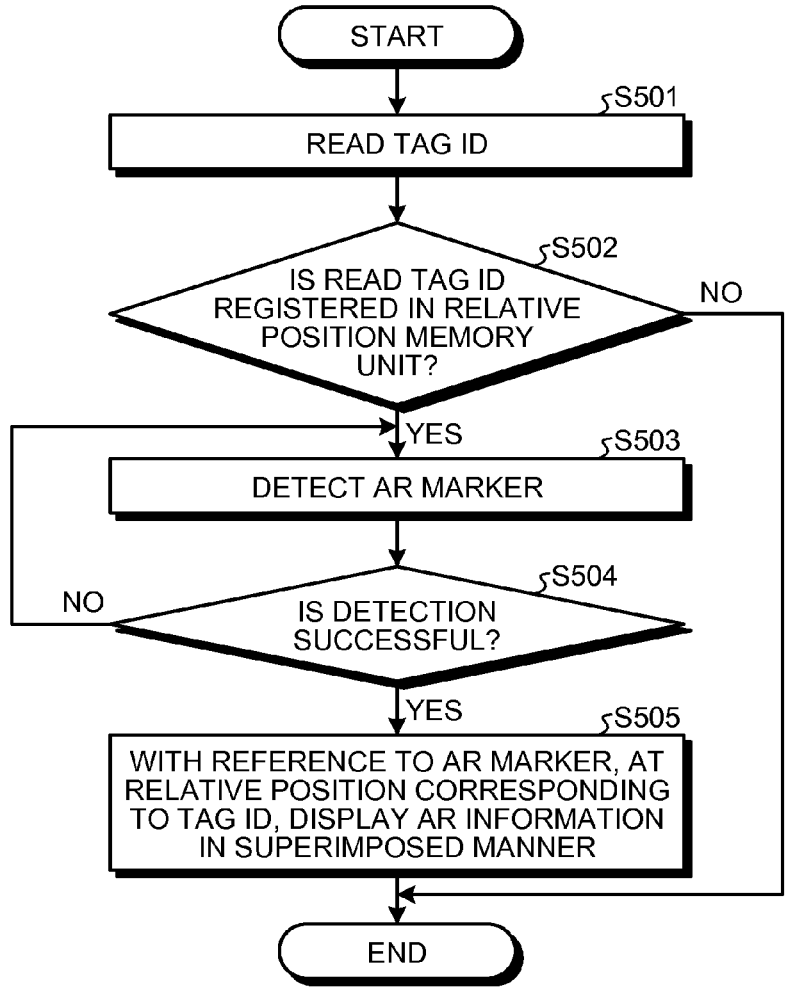
FIG. 21 is a flowchart for explaining a sequence of operations during a display control operation performed according to the fourth embodiment.

FIG. 21 is a flowchart for explaining a sequence of operations during a display control operation performed according to the fourth embodiment. This operation is initiated when the NFC reader 10R reads the tag ID from the NFC tag 30T.

As illustrated in FIG. 21, when the tag ID is read from the NFC tag 30T (Step S501), the detecting unit 62 determines whether or not the tag ID read at Step S501 is registered in the relative position memory unit 61 (Step S502). If the tag ID is not registered in the relative position memory unit 61 (No at Step S502), the operations are ended.

On the other hand, if the tag ID is registered in the relative position memory unit 61 (Yes at Step S502), then the detecting unit 62 detects an AR marker from a camera image taken by the camera 411 (Step S503). Until detection of the AR marker is successful (No at Step S504); every time the camera 411 takes a camera image, the operation at Step S503, that is, detection of the AR marker is performed in a repeated manner.

When detection of the AR marker is successful (Yes at Step S504); with reference to the position of the AR marker in the camera image displayed on the display 412, the display control unit 63 displays, in a superimposed manner, the AR information at the relative position corresponding to the concerned tag ID from the reference position (Step S505). That marks the end of the operations.

As described above, the handheld device 60 according to the fourth embodiment displays the target position for moving the device, which corresponds to the tag ID read from the NFC tag 30T, in a superimposed manner on the head gadget 410 using an AR marker. With that, it becomes possible to provide the task support for moving or connecting the device.

First Application Example of Fourth Embodiment

As a first application example of the fourth embodiment, an LED installed in the finger gadget 120 is flashed in tandem with a touch operation so that AR information can be displayed with the LED light serving as the superimposition position reference. For example, when the sensor unit 101 detects a touch operation, the wrist gadget 100 flashes the LED installed in the finger gadget 120. In response, according to the tag ID read from the NFC tag 30T by the NFC reader 10R, the handheld device 60 recognizes the device 30 to be treated as the task target; and performs image processing to recognize the position of the LED light in the camera image taken by the camera 411. Then, with reference to the position of the LED light in the camera image, the handheld device 60 displays, in a superimposed manner on the camera image displayed on the display 412, the AR information, such as the inspection information, corresponding to the tag ID. As a result, while performing AR display, an AR marker need not be set in advance on the device.

Second Application Example of Fourth Embodiment

As a second application example of the fourth embodiment, the candidate devices installed around the concerned device can be narrowed down by referring to the tag ID read from the NFC tag 30T. Then, the device to be treated as the task target can be searched or identified by performing image processing; and AR information can be displayed in a superimposed manner at the position at which the task is instructed.

For example, when the sensor unit 101 detects a touch operation, the driving of the NFC reader 10R is started so as to read the tag ID from the NFC tag 30T. In response, according to the tag ID read from the NFC tag 30T, the handheld device 60 searches for the devices 30 that are installed around the device 30 to be treated as the task target. As an example, a list is created that includes groups of tag IDs corresponding to the devices installed on each floor of a facility in which inspection is to be carried out. Then, a search for tag IDs is performed with respect to the group that includes the tag ID read from the NFC tag 30T. With that, it becomes possible to identify the devices installed around the device to which the worker 1 has approached or has made contact using the finger gadget 120. Then, in a camera image taken by the camera 411, the handheld device 60 detects, by performing pattern matching, the devices corresponding to the tag IDs of the concerned group. If the surrounding devices are detected, the handheld device 60 displays AR information, such as inspection information, in the vicinity of the surrounding devices that are captured in the camera image displayed on the display 412.

More particularly, when the worker 1 touches an outlet, the NFC reader 10R reads the tag ID of the NFC tag 30T attached to that outlet. As a result, the handheld device 60 recognizes that an outlet C1 is the device corresponding to the read tag ID. Moreover, it is noticed that the outlet C1 is connected to a breaker B1. As a result, breakers B1 to B10 that are installed in the room having the outlet C1 serve as the candidates for image searching.

Third Application Example of Fourth Embodiment

As a third application example of the fourth embodiment, the finger gadget 120, in which the sensors 121 are installed, and the head gadget 410, in which the camera 411 is installed, are configured to operate in tandem so that the visuals seen by the worker 1 can be recorded only during a period of time triggered by hand movements.

For example, the wrist gadget 100 or the handheld device 60 monitors the acceleration output by the motion sensor 121b installed in the finger gadget 120. If the measured values of acceleration continually exceed an acceleration ACCL over a certain period of time TL (seconds), then the wrist gadget 100 or the handheld device 60 start recording the camera images. Then, if the measured values of acceleration continually fall below an acceleration ACCL over a certain period of time TL (seconds), then the wrist gadget 100 or the handheld device 60 stop recording the camera images.

As a result, the recording volume decreases and the battery cells last longer. Besides, even the camera images are checked at a latter point of time, the checking becomes easier because only the important portions are recorded, that is, the situations in which a task is performed are recorded. Moreover, the sensors 121 are installed on a finger of the worker 1, and the camera 411 is installed in the head region of the worker 1. Hence, even if the hand movements serve as an operation trigger, only a small amount of blurring occurs in the recorded images.

Herein, the explanation is given for an example in which recording of the camera images is started when the measured values of acceleration satisfy the conditions mentioned above. Alternatively, the camera images can be buffered, and recording can be done backward over a predetermined period of time TB (seconds) from the point of time at which the measured values satisfy the conditions mentioned above. Moreover, herein, the explanation is given about an example in which recording of the camera images is stopped when the measured values of acceleration satisfy the conditions mentioned above. However, the conditions for stopping the recording are not limited to the conditions mentioned above. Alternatively, the recording can be stopped after a predetermined period of time TA (seconds) is elapsed since starting the recording.

[e] Fifth Embodiment

Till now, the explanation was given about the embodiments of the disclosed device. Beyond that, it is also possible to implement various illustrative embodiments. Given below is the explanation of other embodiments according to the present invention.

Arrangement of Plurality of Tags

For example, in the first to fourth embodiments described above, the explanation is given for an example in which the task support is provided using the tag ID read from a single NFC tag 30T. As an application example of those embodiments, the task support can be provided using tag IDs that are successively read from a plurality of NFC tags 30T.

Figure 22:
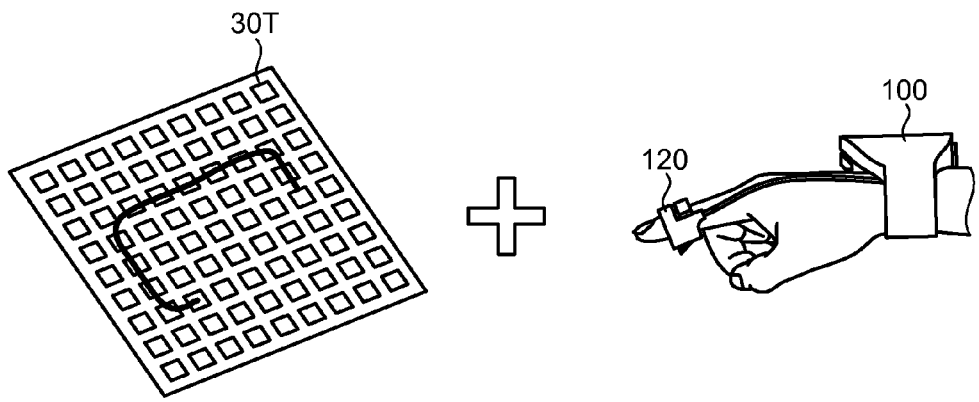
FIG. 22 is a diagram illustrating an exemplary arrangement of a plurality of NFC tags.

FIG. 22 is a diagram illustrating an exemplary arrangement of a plurality of NFC tags. In FIG. 22 is illustrated an example in which extremely-compact NFC tags having dimensions of 4 mm×2 mm×2 mm are arranged in a matrix-like manner. As illustrated in FIG. 22, when a plurality of NFC tags 30T are arranged in a matrix-like manner, reading of the tag IDs using the finger gadget 120 enables performing handwritten character input, handwritten number input, or flick input. For example, the wrist gadget 100 or the handheld device 10 stores a correspondence table in which the position, such as the coordinates, of each NFC tag 30T is stored. In such a configuration, the wrist gadget 100 or the handheld device 10 refers to the correspondence table; and converts the sequence of tag IDs, which are sequentially read by the NFC reader 10R via the finger gadget 120, into the movement locus of the finger gadget 120. As a result, from the handwriting represented by the movement locus of the finger gadget 120, it becomes possible to recognize characters, numbers, or flicks. For example, in the case of a flick, a flick "→" from the left side to the right side can be recognized as "OK", while a flick "↓" from the upper side to the lower side can be recognized as "no good". Meanwhile, the NFC tags illustrated in FIG. 22 can be arranged either on the side of the environment 3 or on the work outfit of the worker 1.

In this way, as a result of arranging a plurality of NFC tags 30T, the arrangement can be used as a touch-sensitive panel having no power source. Moreover, the NFC tags 30T can be attached to a sheet having an arbitrary shape. Besides, since such a sheet can be bent, it enhances the degree of freedom regarding installation positions.

Meanwhile, in the case of attaching different meanings to different reading sequences of a plurality of NFC tags 30T, it becomes necessary to have separators indicating separation among groups. Moreover, depending on the situation, it is necessary to correct the input. However, in the case in which separation or correction is performed using particular tags, if the tags belonging to a single group are positioned in a scattered manner, then the input efficiency undergoes a decline.

Figure 23:
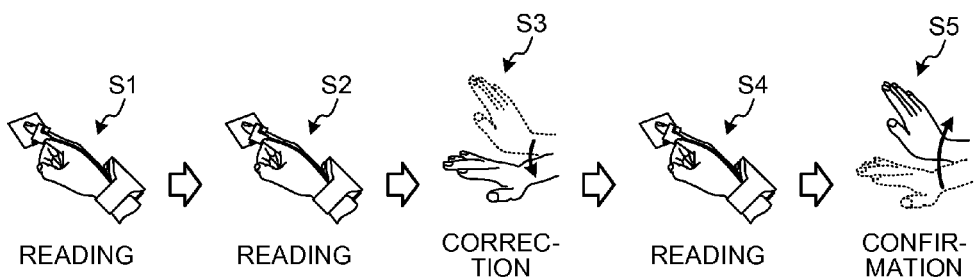
FIG. 23 is a diagram illustrating an exemplary method of using gestures.

In that regard, if the gestures of the worker 1 are assigned to have particular roles, then it results in enhancing the input efficiency. FIG. 23 is a diagram illustrating an exemplary method of using gestures. As illustrated in FIG. 23, at Steps S1 and S2, the worker 1 moves the finger gadget 120 on the sheet on which a plurality of NFC tags are arranged. As a result, a first character and a second character are read. At that time, while any one NFC tag from among the NFC tags arranged on the sheet is being detected, that is, while the writing is being done with one stroke; it is recognized that a single character or a segment of a single character is being input. When none of the NFC tags arranged on the sheet gets detected, it is determined to be a separator between Steps S1 and S2, that is, it is determined to be the first and second characters. Then, at Step S3, from the output of the motion sensor 121b installed in the finger gadget 120, a gesture of moving the hand from right to left is recognized. In this case, of the input characters, the second character input at Step S2 is corrected. Subsequently, at Step S4, a third character is read in place of the second character that was input at Step S2. Lastly, at a Step S5, from the output of the motion sensor 121b installed in the finger gadget 120, a gesture of moving the hand from left to right is recognized. In this case, a character string including the first and third characters is confirmed as the input character string. Meanwhile, herein, although the explanation is given for an example in which a separator is detected according to the presence or absence of a tag, the point of time at which the touch SW 121a switches from the ON state to the OFF state can also be recognized as a separator.

Figure 24:
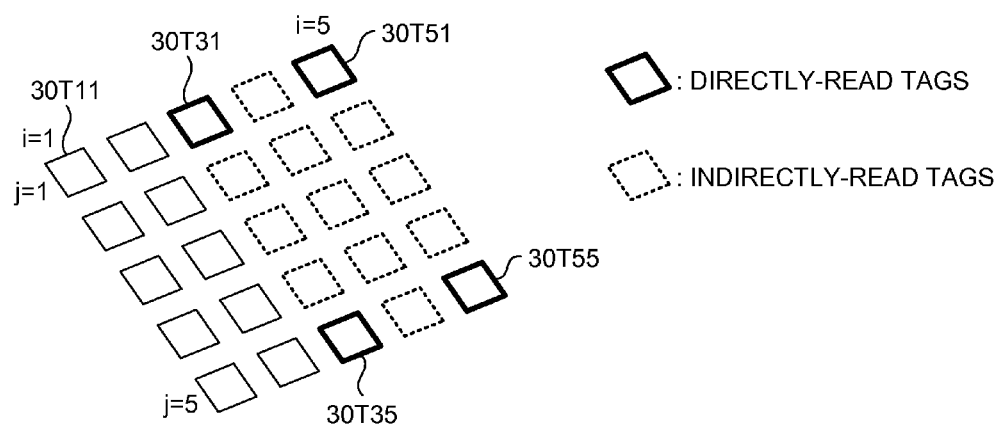
FIG. 24 is a diagram illustrating an exemplary method of inputting a range selection.

Moreover, the wrist gadget 100 or the handheld device 10 can also receive an input of a range selection on the sheet on which a plurality of NFC tags is arranged. FIG. 24 is a diagram illustrating an exemplary method of inputting a range selection. In FIG. 24 is illustrated an example in which NFC tags are arranged as a 5×5 matrix on a sheet. For each tag illustrated in FIG. 24, the coordinates are represented as the corresponding row and the corresponding column. That is, "i" represents the row and "j" represents the column. For example, an NFC tag 30T11 positioned at the first row and the first column is recognized as (1, 1) by the wrist gadget 100 or the handheld device 10. Consider a case in which the tag IDs are read from four NFC tags 30T31, 30T51, 30T35, and 30T55, which are illustrated with thick frames in FIG. 24 and which have coordinates (3, 1), (5, 1), (3, 5), and (5, 5), respectively. In that case, it is recognized that the tag IDs are also read from all NFC tags in the group of NFC tags included within the range of NFC tags 30T31, 30T51, 30T35, and 30T55. That is, it is recognized that the tag IDs are also read from the NFC tags illustrated with dotted lines in FIG. 24. In this way, when the tag IDs are read from a plurality of NFC tags 30T positioned in a scattered manner on the sheet, then an input of range selection can be received under the pretense that the tag IDs are also read from the NFC tags 30T within the range included by the read NFC tags.

Speed Measurement

In the "arrangement of plurality of tags" described above, the explanation is given for an example in which the result of reading the tag IDs is used in the recognition of characters, numbers, or flicks. However, the result of reading is not limited to this usage. Alternatively, the result of reading can be used in speed measurement too.

Figure 25:
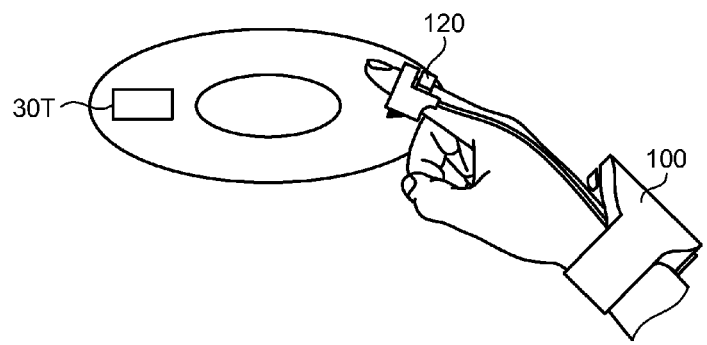
FIGS. 25 and 26 are diagrams illustrating examples of a speed measurement method.
Figure 26:
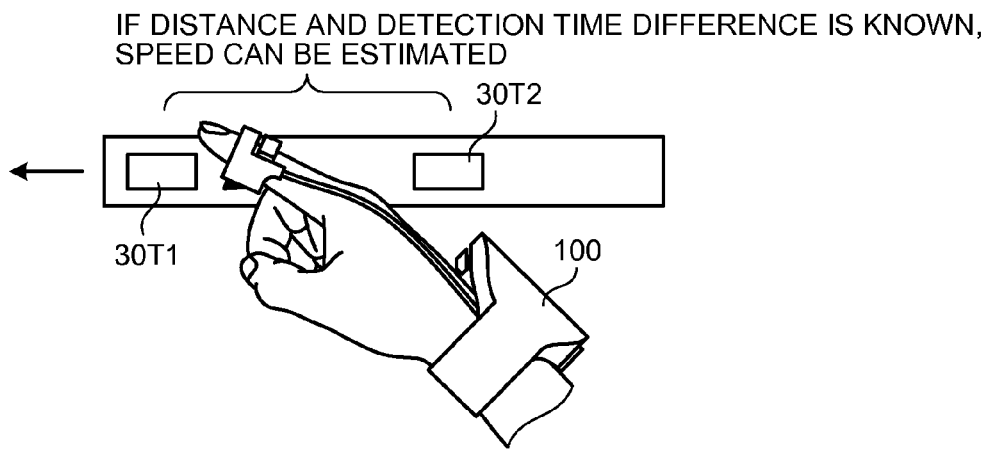

FIGS. 25 and 26 are diagrams illustrating examples of a speed measurement method. As illustrated in FIG. 25, when the worker 1 stops the finger gadget 120 on a disc, the tag ID of the NFC tag 30T placed on the disk is detected in a repeated manner. In that case, from the cycle of detecting the tag ID, it becomes possible to calculate the number of rotations and the rotating speed of the disk. As a result, for example, when the NFC tag 30T is installed on a rotary meter, it becomes possible to inspect whether or not the rotary meter is working in a correct manner. When the NFC tag 30T is placed on a wind turbine, the flow rate can be calculated from the rotating speed of the wind turbine. As illustrated in FIG. 26, when NFC tags 30T1 and 30T2 are placed on a belt conveyer; as long as the distance between the NFC tags 30T1 and 30T2 is known, if the worker 1 stops the finger gadget 120 on the belt conveyer, the NFC tags 30T1 and 30T2 are detected in that order. From the time difference between the detection of the NFC tags 30T1 and 30T2, it is possible to calculate the speed of the belt conveyer. Moreover, if the NFC tags 30T are attached to objects, such as products or luggage, that are carried on the belt conveyer, then the number of objects can be counted. Furthermore, if the objects are arranged at regular intervals on the belt conveyer, then it becomes possible to detect any omission by detecting the irregularity in the time difference between two objects.

Multichannel Reader

In the first to fourth embodiments described above, the explanation is given for an example in which a single antenna 10A and a single NFC reader 10R are installed. However, that is not the only possible case. Alternatively, it is possible to install a plurality of antennas 10A and a plurality of NFC readers 10R.

Figure 27:
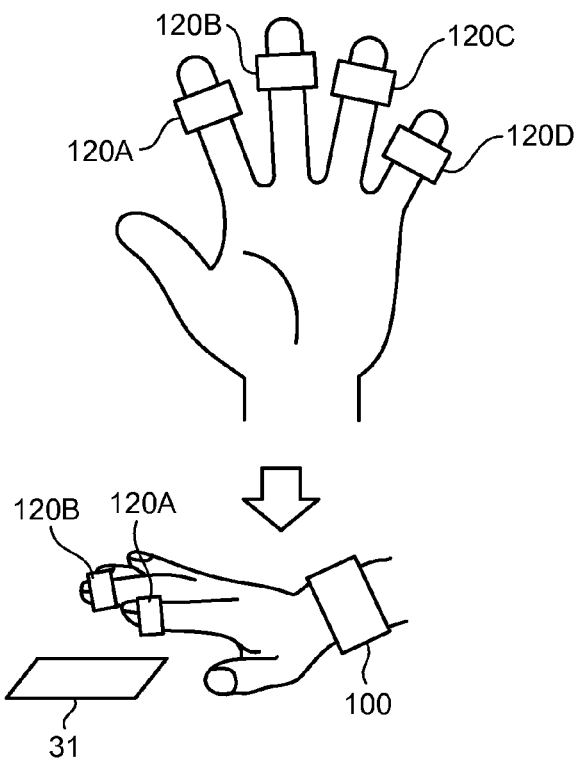
FIG. 27 is a diagram illustrating an exemplary method of reading in which a plurality of finger gadgets is used.

FIG. 27 is a diagram illustrating an exemplary method of reading in which a plurality of finger gadgets is used. In FIG. 27 is illustrated an example in which finger gadgets 120A to 120D are worn on the fingers of a hand except the thumb. As illustrated in FIG. 27, every time the tag ID of a command recognition tag 31 is read via the antenna 10A of one of the finger gadgets 120A to 120D, the wrist gadget 100 or the handheld device 10 store identification information of the concerned finger gadget in chronological order. In the following explanation, a pattern determined according to the order of identification information of the finger gadgets 120 that is stored in chronological order is sometimes referred to as an "order pattern".

Then, the wrist gadget 100 or the handheld device 10 refers to command data that is registered in advance. As an example of the command data, it is possible to use data that, for each order pattern in which the order of identification information of the finger gadgets 120 is defined, is associated to a command executed in response to the detection of the concerned order pattern. Then, the wrist gadget 100 or the handheld device 10 compares the order pattern included in the command data with the order pattern obtained by reading the command recognition tag 31. If the command data includes an order pattern that matches with the order pattern obtained by reading the command recognition tag 31, then the wrist gadget 100 or the handheld device 10 executes the command corresponding to the concerned order pattern.

For example, command data can be defined as follows: a first order pattern "index finger→middle finger→index finger→middle finger" and a first command "map display"; and a second order pattern "index finger→middle finger→annular finger" and a second command "turning of page of inspection information". If reading of the command recognition tag 31 results in the detection of the first order pattern, then the map information of the floor on which the worker 1 is present is displayed on the head-mounted display of the head gadget 110. If reading of the command recognition tag 31 results in the detection of the second order pattern, then the page of the inspection information displayed on the head-mounted display of the head gadget 110 is updated to the next page.

Keyboard of NFC Tags

The "arrangement of plurality of tags" and the "multichannel reader" can be implemented in combination too. That is, in an information reading system, performing character input is a difficult task, and carrying around the devices needing power source is troublesome. In that regard, under the condition in which a plurality of finger gadgets 120 are worn on the fingers, a tag keyboard having a plurality of NFC tags 30T arranged in an identical manner to a keyboard is touched with the fingertips attached with the finger gadgets 120, and key input is performed. In this case, correspondence relationship between the tag IDs associated to the keys and the identification information of the finger gadgets 120 used in touching the keys is stored. If there is a mismatch in the correspondence relationship between a finger gadget used in reading and the tag ID that is read, then the touch is recognized to be off-position. When such an off-position touch occurs; from among the keys placed around the key corresponding to the read tag ID, a key can be selected that is highly likely to be touched by the finger attached with the finger gadget 120 that read the tag ID, and the input key can be corrected automatically. Such a tag keyboard can be implemented without a power source and can also be rolled up. That makes it easier to carry along the tag keyboard.

Figure 28:
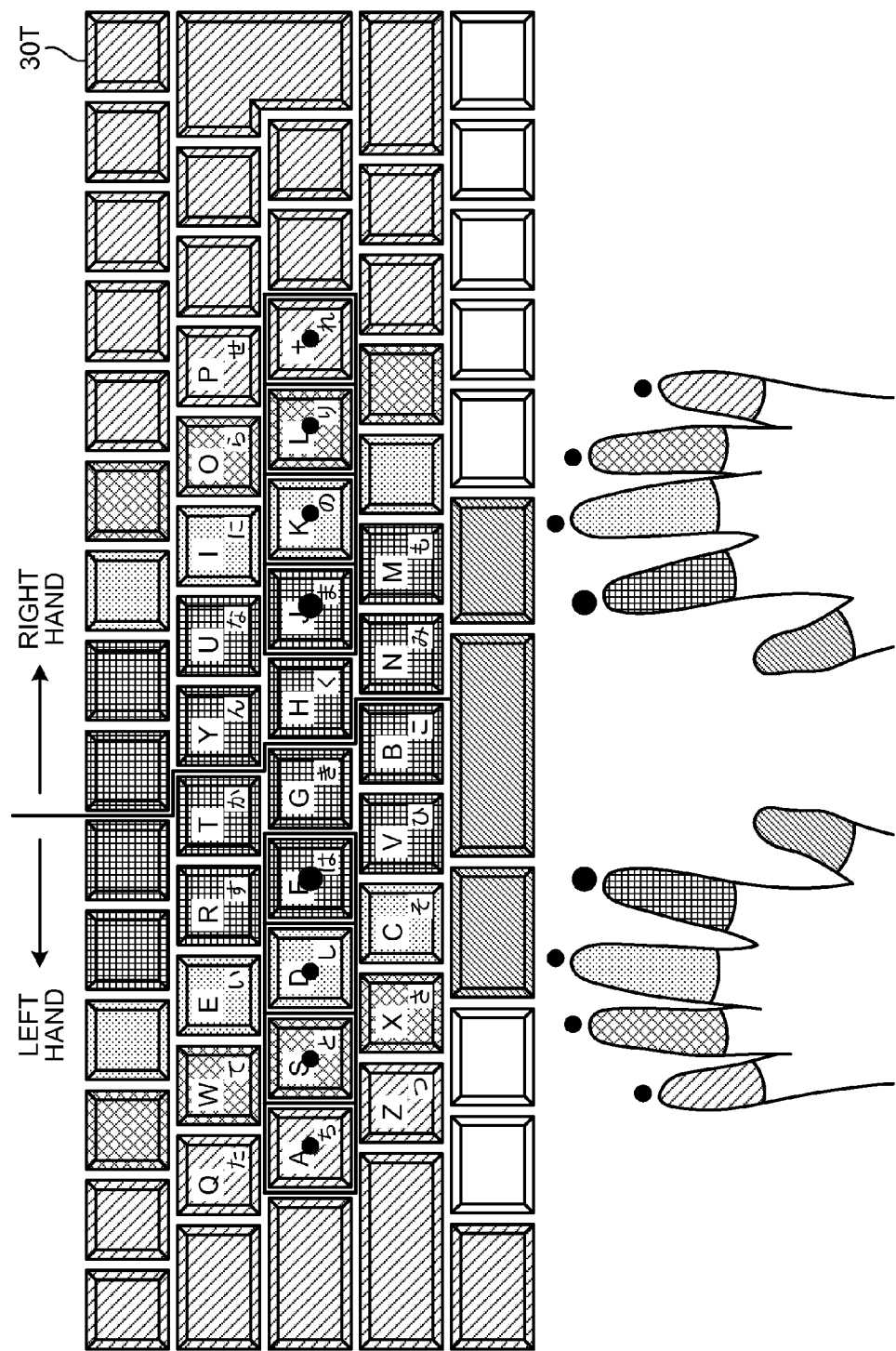
FIG. 28 is a diagram illustrating an exemplary tag keyboard.

FIG. 28 is a diagram illustrating an exemplary tag keyboard. In FIG. 28, each finger type and the keys touched by that finger type are illustrated with identical hatching. For example, the left annular finger and the characters such as "W", "S", "X", and so on touched by the left annular finger are illustrated with identical hatching. Using the tag keyboard illustrated in FIG. 28, if "ishokawaken" is input, then it is assumed that the tag ID corresponding to the key "o" is touched by the finger gadget worn on the middle finger of the right hand. In that case, since the correspondence relationship between the finger gadget that performed reading and the read tag ID does not match, "o" of "ishokawaken" is determined to be an inputting error. Then, of the keys "I", "K", and so on that could be touched by the finger gadget worn on the middle finger of the right hand, the key "I" that is closest to the key "O" corresponding to the read tag ID is used to perform correction to the input character "i". As a result, "ishokawaken" can be automatically corrected to "ishikawaken".

Attachment of Tags to Body: Case 1

In the first to fourth embodiments described above, the explanation is given for an example in which the NFC tags 30T are arranged around the devices on the side of the environment 3. However, alternatively, it is also possible to attach NFC tags to the body of the worker 1. For example, the NFC tag 30T is attached to the tip of each finger, such as the fingernail of each finger; and each tag ID is given a meaning. Then, if a finger is bent toward an antenna for the purpose of reading a tag ID, it becomes possible to operate a device.

Figure 29:
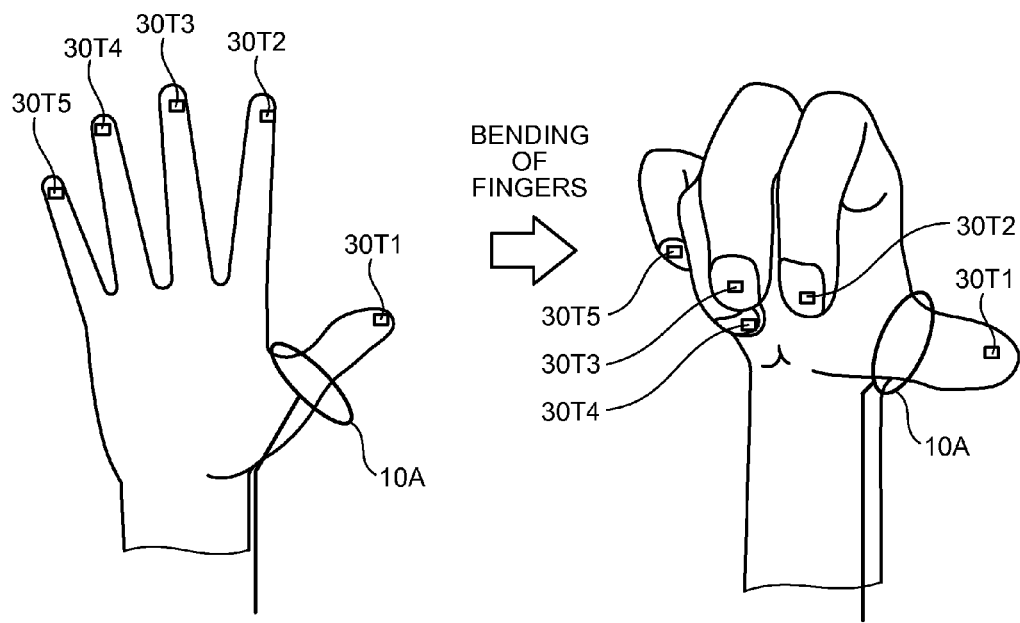
FIGS. 29 to 31 are examples of attaching NFC tags to the body.

FIG. 29 is an example of attaching the NFC tags to the body. On the left side in FIG. 29 is illustrated a right hand with the open palm. On the right side in FIG. 29 is illustrated a right hand with the palm closed by bending the fingers. As illustrated in FIG. 29, NFC tags 30T1 to 30T5 are attached to the five fingers of the right hand, from the thumb to the little finger in that order. In order to read the tag IDs of the NFC tags 30T1 to 30T5, the antenna 10A of the NFC reader 10R that is attached near the base of the thumb is used. The antenna 10A is attached in a ring-like manner or is attached to have the antenna opening surface facing the palm. For example, if the tag ID of the NFC tag 30T4 attached to the annular finger and the tag ID of the NFC tag 30T3 attached to the middle finger are read in that order, then a command for displaying an information screen on the display of the head gadget 110 is executed. Moreover, if the tag ID of the NFC tag 30T3 attached to the middle finger and the tag ID of the NFC tag 30T4 attached to the annular finger are read in that order, then a command for deleting the information screen is executed. Such command operations can be easily performed by a person in, what is called, an eyes-free manner without having to restrict one's senses. Meanwhile, the antenna 10A can be attached to any other finger other than the thumb. However, using the bodily characteristics, attaching the antenna 10A to the base of the thumb allows an easy access to all five fingertips.

Attachment of Tags to Body: Case 2

The NFC tags 30T can be attached to other body parts other than the hands. In this case, the NFC tags 30T can be stitched into clothing, or can be attached as seals to clothing, or can be worn as accessories on body parts. Moreover, the NFC tags 30T can be manufactured to have subtle roughness that can be sensed by touch. Such roughness is consciously read by the worker 1 using the antenna 10A of the finger gadget 120. As a result, it becomes possible to make use of the heuristic that a body part can be touched without restricting the eyesight. Hence, while reading the tag IDs, the tags attached to the body can be easily read without having to pay particular attention. Then, using the tags that are read and the chronological data, it becomes possible to control the information as explained in the first to fifth embodiments.

Figure 30:
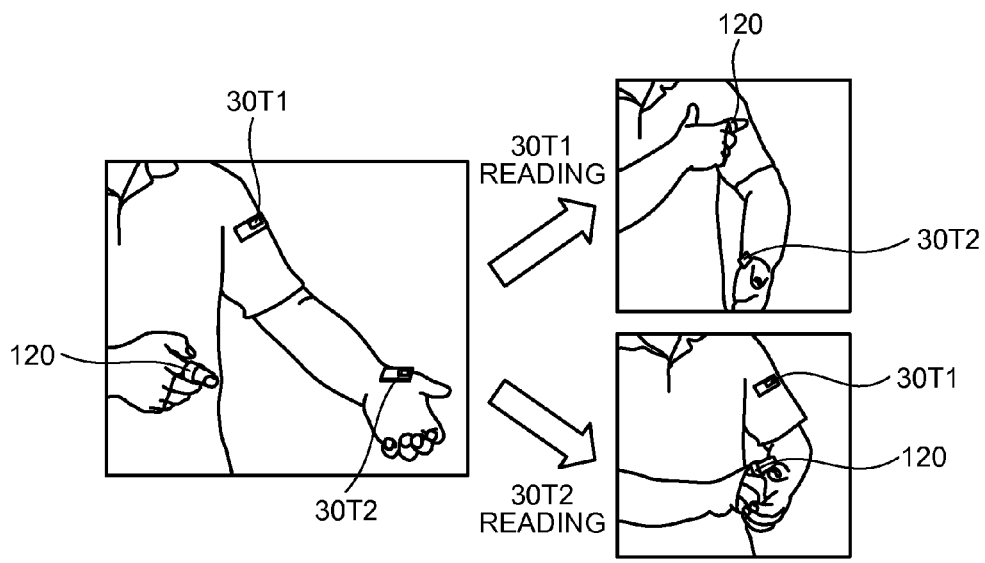

FIG. 30 is a diagram illustrating an example of attaching NFC tags to the body. In FIG. 30 is illustrated an example in which the NFC tag 30T1 is attached to a shoulder of the worker 1 and the NFC tag 30T2 is attached to the base of a thumb of the worker 1. As illustrated in FIG. 30, the worker 1 can move the finger gadget 120 close to the NFC tag 30T1, which is attached to a shoulder, as well as close to the NFC tag 30T2, which is attached to the base of a thumb, in an eyes-free manner. For example, if reading of the tag ID from the NFC tag 30T1 attached to a shoulder is followed by reading of the tag ID from the NFC tag 30T2 attached to the base of a thumb, then the handheld device 10 can execute a command for displaying an information screen on the display of the head gadget 110. Moreover, if reading of the tag ID from the NFC tag 30T2 attached to the base of a thumb is followed by reading of the tag ID from the NFC tag 30T1 attached to a shoulder, then the handheld device 10 can execute a command for deleting the information screen. Such operations can be easily performed by a person without having to restrict the eyesight. Meanwhile, herein, the explanation is given for an example in which the handheld device 10 determines the reading sequence and issues commands. However, alternatively, those operations can be performed by the wrist gadget 100.

Attachment of Tags to Body: Case 3

The NFC tag 30T and the NFC reader 10R or the antenna 10A can be placed at such body parts of a person that, during particular actions of that person, the NFC tag 30T and the NFC reader 10R or the antenna 10A come close to each other. Moreover, the NFC reader 10R can have the antennas 10A branched to a plurality of positions instead of a single position, so that simultaneous reading can be performed. Herein, the antennas 10A can be short distance wireless devices.

Figure 31:
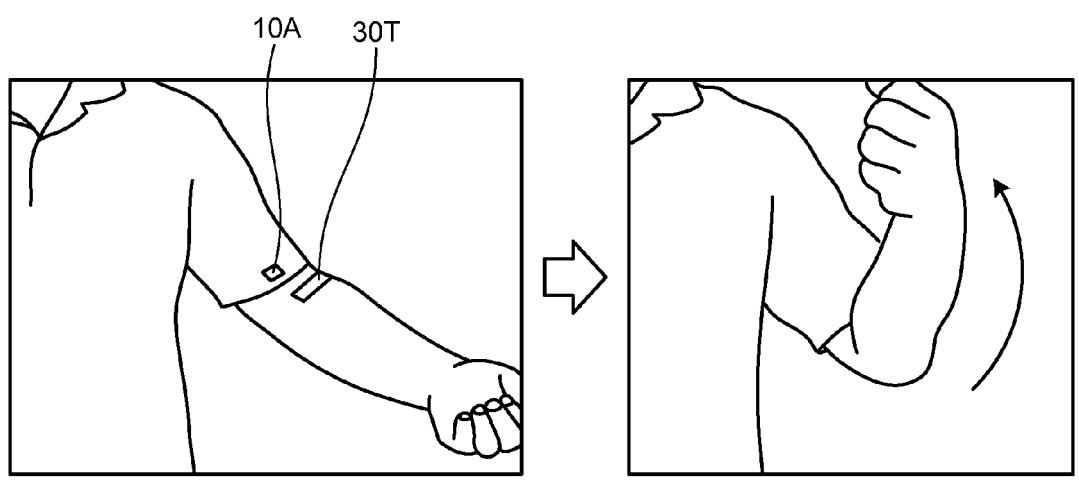

FIG. 31 is a diagram illustrating an example of attaching a NFC tag to the body. In FIG. 31 is illustrated an example in which, in an axisymmetric manner with respect to the joint of the left arm, the antenna 10A is attached to the base side and is connected to the NFC reader 10R via an extension cable, and the NFC tag 30T is attached to the side of the leading end. When the worker 1 bends the left arm from a straight position, the antenna 10A and the NFC tag 30T face each other and come close or make contact with each other. As a result, the tag ID is read from the NFC tag 30T via the antenna 10A. If the number of times for which the NFC tag 30T is read is counted, then it also becomes possible to monitor the load measurement of the corresponding task. Aside from that, if an NFC tag and an antenna are attached at the joint of the right arm in an identical manner, and if the tags are read by bending the right arm and bending the left arm in that order; then a command can be executed for displaying an information screen on the HMD. On the other hand, if the tags are read by bending the left arm and bending the right arm in that order, then a command can be executed for deleting the information screen. Such operations do not require the confirmation of contact for the purpose of reading the tags. Hence, a person can perform the operations easily and without having to restrict the eyesight. Herein, the explanation is given for an example in which the NFC tag and the antenna are attached in the vicinity of the joint of an arm. However, alternatively, an NFC tag and an antenna can be attached in the vicinity of an ankle joint or in the vicinity of a knuckle joint of a hand or a leg.

First Application Example of Gadgets

In the first to fourth embodiments described above, a finger gadget is used as the gadget including the touch SW 121a and the antenna 10A. However, as long as a gadget is a wearable gadget, it serves the purpose and there is no restriction on the body part to which the gadget can be attached.

Figure 32:
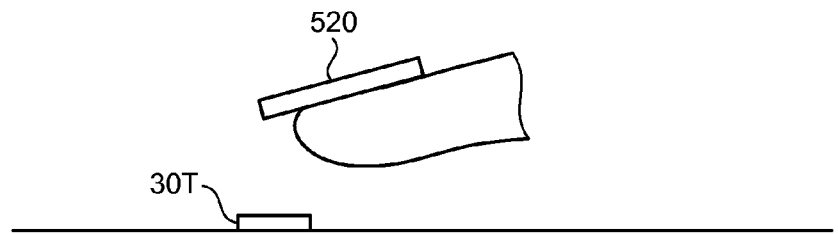
FIGS. 32 to 38 are diagrams illustrating application examples of a wearable gadget.
Figure 33:
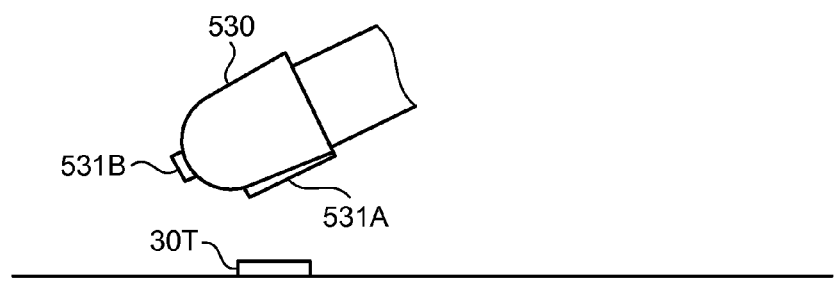

FIGS. 32 and 33 are diagrams illustrating application examples of a wearable gadget. In FIG. 32 is illustrated an artificial-fingernail-type gadget 520 that is attached to the surface of a fingernail. As illustrated in FIG. 32, since the artificial-fingernail-type gadget 520 is attached to the leading end of a finger, it is easier to touch the target. Moreover, while using the artificial-fingernail-type gadget 520, since the ball of the thumb is exposed, the feel of objects is also not lost. As illustrated in FIG. 33, while using a fingerstall-type gadget 530 too, since the fingerstall-type gadget 530 is attached to the leading end of a finger, it is easier to touch the target. Moreover, since the fingerstall-type gadget 530 covers the leading end of the finger, it becomes possible to protect the fingertip while performing a task at dangerous places such as a site of electrical leakage or a site in which incisive metallic pieces lay bare. Moreover, in the case of implementing a touch SW in the fingerstall-type gadget 530, a touch SW 531A can be implemented on the side of the ball of the finger, or a touch SW 531B can be implemented at the fingertip. Meanwhile, although not illustrated in FIGS. 32 and 33, it is needless to say that the antenna 10A is installed in an extending manner from the NFC reader 10R.

Second Application Example of Gadgets

Figure 34:
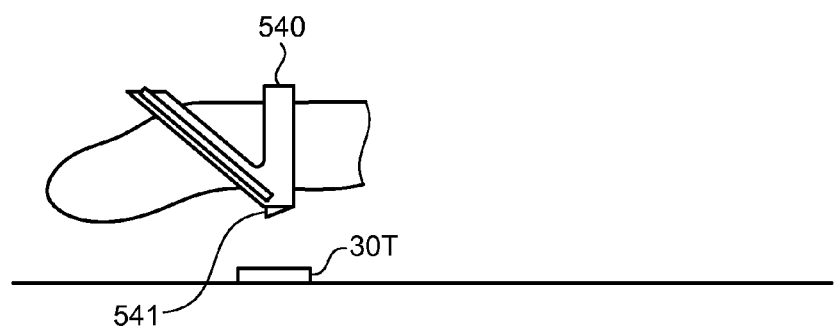
Figure 35:
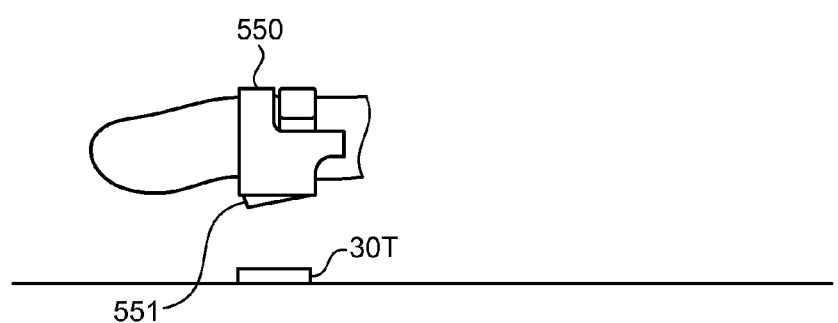
Figure 36:
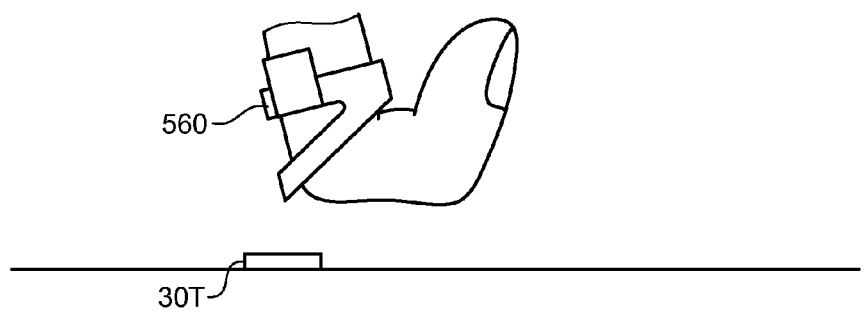

The exemplary structures of the finger gadget explained in the first to fourth embodiments are only partial, and it is also possible to implement other structures. FIGS. 34 to 36 are diagrams illustrating application examples of a wearable gadget. In FIGS. 34 to 36 are illustrated ring-type gadgets 540 to 560, respectively. The ring-type gadget 540 illustrated in FIG. 34 and the ring-type gadget 550 illustrated in FIG. 35 are attached to the middle phalanx of a finger of the worker 1. In the case of implementing a touch SW in the ring-type gadget 540 illustrated in FIG. 34, a touch SW 541 can be implemented on the side of the ball of the finger. In the case of implementing a touch SW in the ring-type gadget 550 illustrated in FIG. 35, a touch SW 551 can be implemented on the side of the ball of the finger. The ring-type gadget 560 illustrated in FIG. 36 is attached to the proximal phalanx of a finger of the worker 1. Regarding the ring-type gadget 560, the finger is bent so that the target is touched with the outside of the middle phalanx. Since the ring-type gadgets 540 to 560 allow the fingertip to be exposed, they can also be used while performing examination by touch such as unevenness confirmation or temperature confirmation. Moreover, since there is a sense of oneness with the finger, it feels comfortable. Meanwhile, although not illustrated in FIGS. 34 to 36, it is needless to say that the antenna 10A is installed in an extending manner from the NFC reader 10R.

Third Application Example of Gadgets

Figure 37:
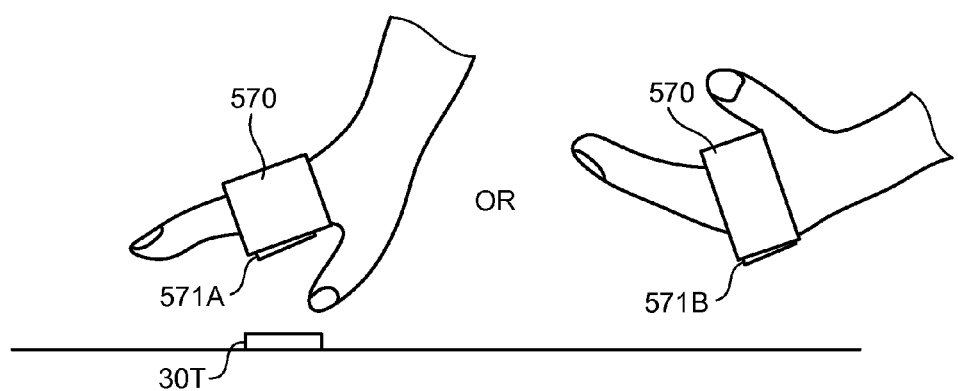
Figure 38:
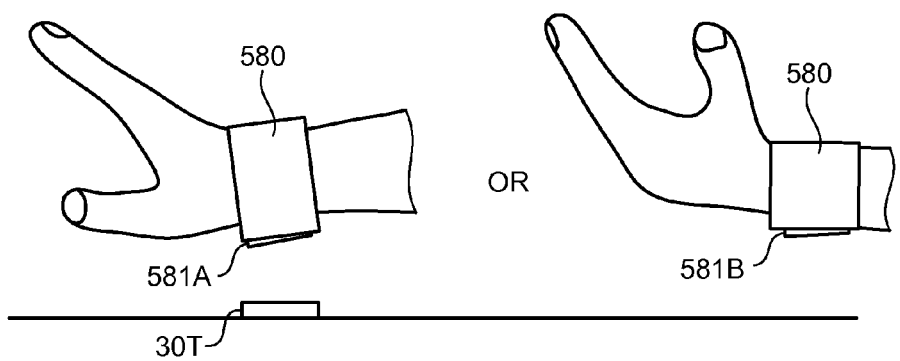

It is also possible to use a gadget to be attached to other body parts other than a fingernail or a finger as explained in the first and second application examples. FIGS. 37 and 38 are diagrams illustrating examples of a wearable gadget. In FIG. 37 is illustrated a palm-band-type gadget 570, and in FIG. 38 is illustrated a wristband-type gadget 580. The palm-band-type gadget 570 is attached to the back of a hand or the palm of a hand of the worker 1. In the case of implementing a touch SW in the palm-band-type gadget 570 illustrated in FIG. 37, a touch SW 571A can be implemented on the side of the palm, or a touch SW 571B can be implemented on the back of the hand. The palm-band-type gadget 570 can be effectively utilized while performing a task in which all fingers are used, such as while tuning a musical instrument, while assembling components, or while performing wiring. The wristband-type gadget 580 illustrated in FIG. 38 is attached to a wrist of the worker 1. In the case of implementing a touch SW in the wristband-type gadget 580 illustrated in FIG. 38, a touch SW 581A can be implemented on the side of the wrist facing the palm, or a touch SW 581B can be implemented on the side of the wrist facing the back of the hand. The wristband-type gadget 580 can be effectively utilized in a situation in which the entire hand is exposed, such as during cooking or during formative activities. Moreover, the wristband-type gadget 580 can be integrated with the wrist gadget 100. Meanwhile, although not illustrated in FIGS. 37 and 38, it is needless to say that the antenna 10A is installed in an extending manner from the NFC reader 10R.

Separation and Integration

The constituent elements of the devices illustrated in the drawings are merely conceptual, and need not be physically configured as illustrated. The constituent elements, as a whole or in part, can be separated or integrated either functionally or physically based on various types of loads or use conditions. For example, some or all of the functional components of the wrist gadget according to the embodiments can be included in the handheld device. Moreover, the finger gadget and the wrist gadget according to the embodiments can be integrated from the structural and functional perspectives into a single hand-glove-type gadget.

Reading Control Program

The various operations explained in the embodiments can be implemented by executing computer programs, which are written in advance, in a computer such as a personal computer or a workstation. Explained below with reference to FIG. 39 is an exemplary computer that executes a reading control program having the same functions as the functions explained in the embodiments.

Figure 39:
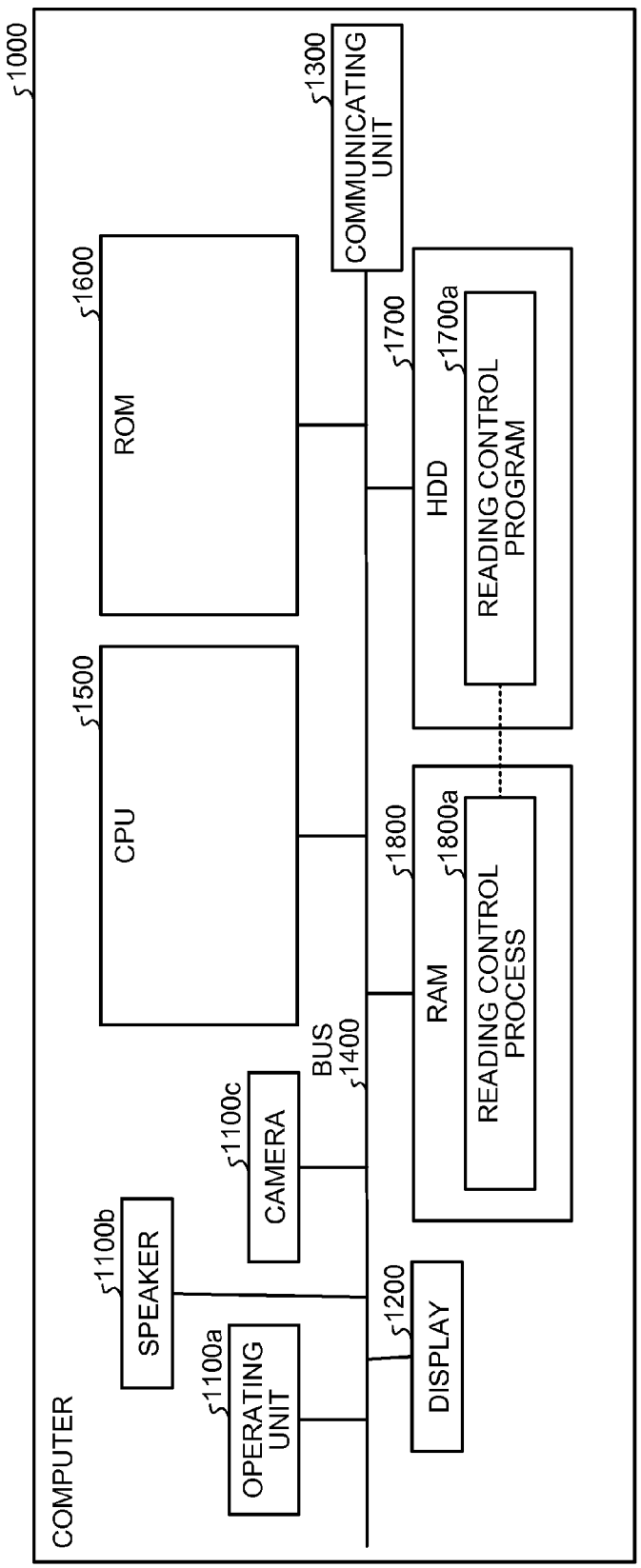
FIG. 39 is a diagram for explaining an exemplary computer that executes a reading control program according to the first to fifth embodiments.

FIG. 39 is a diagram for explaining an exemplary computer that executes a reading control program according to the first to fifth embodiments. As illustrated in FIG. 39, a computer 1000 includes an operating unit 1100a, a speaker 1100b, a camera 1100c, a display 1200, and a communicating unit 1300. Moreover, the computer 1000 includes a central processing unit (CPU) 1500, a read only memory (ROM) 1600, a hard disk drive (HDD) 1700, and a random access memory (RAM) 1800. The constituent elements 1100 to 1800 are connected to each other by a bus 1400.

As illustrated in FIG. 39, the HDD 1700 is used to store in advance a reading control program 1700a that has identical functions to the functions of the sensor unit 101 and the reading control unit 102 according to the first embodiment.

Moreover, regarding the implementation of the functions of the functional components according to the embodiments other than the first embodiment, it is possible to store in the HDD 1700 an add-in module for each embodiment or an add-in module for a combination of the embodiments. Regarding the reading control program 1700a, integration and separation can be done in an identical manner to the constituent elements of the functional components illustrated in FIGS. 2, 9, 15, and 19. Specifically, not all pieces of the data need to be always stored in the HDD 1700 as long as only the data needed for a process is stored in the HDD 1700.

The CPU 1500 reads the reading control program 1700a from the HDD 1700, and loads it in the RAM 1800. Consequently, as illustrated in FIG. 39, the reading control program 1700a functions as a reading control process 1800a, which expands a variety of data read from the HDD 1700 into an area assigned to itself in the RAM 1800 and performs various operations based on the expanded data. Moreover, the reading control process 1800a includes the operations performed by the functional components illustrated in FIGS. 2, 9, 15, and 19. For example, the reading control process 1800a includes the operations illustrated in FIGS. 5, 7, 17, 18, and 21. Furthermore, for each of the processing units virtually implemented in the CPU 1500, not all of the processing units are needed to be always operated in the CPU 1500 as long as only the processing unit need to be operated is virtually implemented.

Meanwhile, the reading control program 1700a need not be stored in the HDD 1700 or the ROM 1600 from the start. Alternatively, for example, computer programs can be stored in a portable physical medium such as a flexible disk (FD), a compact disk read only memory (CD-ROM), a digital versatile disk (DVD), a magnetic optical disk, or an IC card. Then, the computer 1000 can obtain the computer programs from the portable physical medium, and execute the computer programs. Alternatively, the computer programs can be stored in another computer or a server device that is connected to the computer 1000 via a public line, the Internet, a local area network (LAN), or a wide area network (WAN). Then, the computer 1000 can obtain the computer programs from the other computer or the server device, and execute the computer programs.

In this way, information of tags can be read at low power.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information reading system comprising:
    a passive-type IC tag that identifies a device installed on a side of an environment;
    a tag reader that reads identification information of the passive-type IC tag;
    a sensor unit that detects a touch operation performed with respect to the passive-type IC tag; and
    a reading control unit that, when the sensor unit detects a touch operation, activates the tag reader and controls a timing of reading the passive-type IC tag, wherein
    the reading control unit activates a watchdog timer (WDT), monitors a timeout, monitors, using the watchdog timer, whether or not a predetermined period of time has elapsed since a switch has switched to an OFF state, and instructs, when the watchdog timer times out, a handheld device to stop driving the tag reader so as to end reading information from the passive-type IC tag, and
    the sensor unit monitors and obtains an output of a motion sensor, estimates a movement locus of a finger gadget from the output of the motion sensor every time the output of the motion sensor is obtained, calculates a position of the finger gadget, obtains a speed by integrating an acceleration, obtains a distance by further integrating the speed, based on an orientation obtained along with the acceleration, and calculates a movement distance from an initial position by accumulating and synthesizing, for each sampling period, vectors of movement distance and direction.

2. The information reading system according to claim 1, further comprising:
    the finger gadget includes an antenna extended from the tag reader and a sensor used in detection performed by the sensor unit;
    a second gadget that includes the sensor unit and the reading control unit;
    the handheld device that makes use of identification information read by the tag reader, and executes a computer program for controlling execution of commands related to a task support provided to the device; and
    a server device that provides data, which is to be used in the computer program, to the handheld device, wherein
    the finger gadget makes the second gadget return from a sleep state,
    the second gadget makes the handheld device return from a sleep state, and
    the handheld device makes the server device return from a sleep state.

3. The information reading system according to claim 1, further comprising a notification control unit that, when the reading control unit is driving the tag reader, issues a notification about driving of the tag reader.

4. The information reading system according to claim 1, wherein the passive-type IC tag is arranged in plurality in a matrix.

5. The information reading system according to claim 1, wherein the reading control unit performs control of a plurality of antennas extended from the tag reader or performs control of reading timing of a plurality of tag readers.

6. The information reading system according to claim 1, further comprising a passive-type IC tag that is attached to body of a worker who performs a task related to the device, wherein
    the tag reader or the antenna extended from the tag reader is attached to the body of the worker, and
    the reading control unit further controls the timing at which the tag reader reads information from the passive-type IC tag attached to the body of the worker.

7. The information reading system according to claim 1, further comprising a wearable gadget that includes an antenna extended from the tag reader or includes the tag reader, wherein
    the wearable gadget is attachable to any one of a fingertip, ball of a finger, back of a finger, palm of a hand, back of a hand, periphery of a wrist, or a finger.

8. The information reading system according to claim 1, further comprising:
- a relative position memory unit that is used to store, for each set of identification information of the passive-type IC tag, a relative position which represents a destination position of a device corresponding to concerned identification information and which is expressed by comparison with a marker placed in the environment;
- a detecting unit that detects a marker from an image taken by a camera which is attached to head region of a worker who performs a task related to the device; and
- a display control unit that refers to the relative position memory unit and, with reference to position of a marker displayed on a transmissive display which is attached to head region of the worker, displays, in a superimposed manner, information of a device corresponding to the identification information at a relative position from the reference and corresponding to the identification information read by the tag reader.

9. The information reading system according to claim 1, further comprising a detecting unit that detects, from an image taken by a camera which is attached to head region of a worker performing a task related to the device, a light source which flashes in tandem with the touch operation during detection of the touch operation, wherein
- in an image displayed on a transmissive display that is attached to head region of the worker, information of a device corresponding to identification information read by the tag reader is displayed in a superimposed manner at position of the light source detected in the image by the detecting unit.

10. The information reading system according to claim 1, further comprising:
- a narrowing unit that refers to identification information read by the tag reader and narrows down on a device installed around a device corresponding to the identification information; and
- a detecting unit that performs image processing and detects a device narrowed down by the narrowing unit from an image taken by a camera which is attached to head region of a worker who performs a task related to the device, wherein
- when the detecting unit detects the device from the image, in an image displayed on a transmissive display that is attached to head region of the worker, information of a device corresponding to identification information read by the tag reader is displayed in a superimposed manner at position of the device detected in the image by the detecting unit.

11. The information reading system according to claim 1, further comprising a recording unit that records an image taken by a camera which is attached to head region of a worker who performs a task related to the device, wherein
- the recording unit records the image for a period of time during which sensor values obtained by a sensor included in a gadget that is attached to an arm, a wrist, or a finger of the worker satisfy a predetermined condition.

12. A reading control device comprising:
- a sensor unit that detects a touch operation performed with respect to a passive-type IC tag which identifies a device installed on a side of an environment; and
- a reading control unit that, when the sensor unit detects a touch operation, activates a tag reader, which reads identification information of the passive-type IC tag, and controls a timing of reading the passive-type IC tag wherein
  - the reading control unit activates a watchdog timer (WDT), monitors a timeout, monitors, using the watchdog timer, whether or not a predetermined period of time has elapsed since a switch has switched to an OFF state, and instructs, when the watchdog timer times out, a handheld device to stop driving the tag reader so as to end reading information from the passive-type IC tag, and
  - the sensor unit monitors and obtains an output of a motion sensor, estimates a movement locus of a finger gadget from the output of the motion sensor every time the output of the motion sensor is obtained, calculates a position of the finger gadget, obtains a speed by integrating an acceleration, obtains a distance by further integrating the speed, based on an orientation obtained along with the acceleration, and calculates a movement distance from an initial position by accumulating and synthesizing, for each sampling period, vectors of movement distance and direction.

13. A reading control method comprising:
- detecting a touch operation performed with respect to a passive-type IC tag which identifies a device installed on a side of an environment; and
- controlling that, when a touch operation is detected, includes activating a tag reader, which reads identification information of the passive-type IC tag, and controlling a timing of reading the passive-type IC tag, wherein
  - the controlling includes activating a watchdog timer (WDT), monitoring a timeout, monitoring, using the watchdog timer, whether or not a predetermined period of time has elapsed since a switch has switched to an OFF state, and instructing, when the watchdog timer times out, a handheld device to stop driving the tag reader so as to end reading information from the passive-type IC tag, and
  - the detecting includes monitoring and obtaining an output of a motion sensor, estimating a movement locus of a finger gadget from the output of the motion sensor every time the output of the motion sensor is obtained, calculating a position of the finger gadget, obtaining a speed by integrating an acceleration, obtaining a distance by further integrating the speed, based on an orientation obtained along with the acceleration, and calculating a movement distance from an initial position by accumulating and synthesizing, for each sampling period, vectors of movement distance and direction.

* * * * *